(12) United States Patent
Yamada et al.

(10) Patent No.: US 8,828,603 B2
(45) Date of Patent: Sep. 9, 2014

(54) SECONDARY BATTERY, BATTERY PACK, ELECTRIC VEHICLE, ELECTRIC POWER STORAGE SYSTEM, POWER TOOL, AND ELECTRONIC APPLIANCE

(75) Inventors: Ichiro Yamada, Fukushima (JP); Tadahiko Kubota, Kanagawa (JP)

(73) Assignee: Sony Corporation (JP)

( * ) Notice: Subject to any disclaimer, the term of this patent is extended or adjusted under 35 U.S.C. 154(b) by 90 days.

(21) Appl. No.: 13/588,757

(22) Filed: Aug. 17, 2012

(65) Prior Publication Data

US 2013/0052523 A1 Feb. 28, 2013

(30) Foreign Application Priority Data

Aug. 30, 2011 (JP) ................... 2011-187633

(51) Int. Cl.
```
H01M 6/04      (2006.01)
B60L 11/18     (2006.01)
H01M 10/42     (2006.01)
H01M 10/0567   (2010.01)
H01M 10/052    (2010.01)
H01M 10/48     (2006.01)
H01M 10/46     (2006.01)
H01M 10/0565   (2010.01)
```
(52) U.S. Cl.
CPC .......... *B60L 11/1879* (2013.01); *H01M 10/052* (2013.01); *H01M 10/48* (2013.01); *Y02E 60/12* (2013.01); *Y02T 10/7005* (2013.01); *Y02T 10/7011* (2013.01); *H01M 10/46* (2013.01); *H01M 10/0565* (2013.01); *Y02T 10/705* (2013.01); *H01M 10/4235* (2013.01); *H01M 10/0567* (2013.01); *H01M 2220/20* (2013.01)
USPC ........... 429/189; 429/321; 429/322; 429/323; 429/199

(58) Field of Classification Search
CPC ............................ H01M 4/382; H01M 10/056
USPC ........................ 429/199, 321, 322, 323, 189
See application file for complete search history.

(56) References Cited

U.S. PATENT DOCUMENTS

2008/0076023 A1* 3/2008 Yumoto .................. 429/178
2010/0009257 A1 1/2010 Kang et al.

FOREIGN PATENT DOCUMENTS

| JP | 4270904 | 9/1992 |
| JP | 07-263027 | 10/1995 |
| JP | 2009-526349 | 7/2009 |

* cited by examiner

*Primary Examiner* — Jane Rhee
(74) *Attorney, Agent, or Firm* — Sheridan Ross P.C.

(57) ABSTRACT

A secondary battery includes: an electrolytic solution; a positive electrode; and a negative electrode, at least one of the positive electrode, the negative electrode, and the electrolytic solution containing an alkyl carbonate represented by the following formula (1)

$$R-O-C(=O)-O-X \quad (1)$$

wherein R is a linear alkyl group or halogenated alkyl group having a carbon number of from 8 to 20, or a branched alkyl group or halogenated alkyl group having a carbon number of from 8 to 20 in a main chain thereof; and X is an alkali metal element.

20 Claims, 6 Drawing Sheets

SECONDARY BATTERY, BATTERY PACK, ELECTRIC VEHICLE, ELECTRIC POWER STORAGE SYSTEM, POWER TOOL, AND ELECTRONIC APPLIANCE

CROSS REFERENCES TO RELATED APPLICATIONS

The present application claims priority to Japanese Priority Patent Application JP 2011-187633 filed in the Japan Patent Office on Aug. 30, 2011, the entire content of which is hereby incorporated by reference.

BACKGROUND

The present application relates to a secondary battery equipped with an electrolytic solution as well as a positive electrode and a negative electrode and to a battery pack, an electric vehicle, an electric power storage system, a power tool, and an electronic appliance, each using the secondary battery.

In recent years, a variety of electronic appliances represented by a mobile phone, a personal digital assistant (PDA), or the like have widely spread, and it is strongly demanded to realize even more downsizing, weight reduction, and long service life thereof. Following this, the development of, as an electric power source, a battery, in particular, a secondary battery which is small-sized and lightweight and from which a high energy density is obtainable, is being advanced. Recently, as for this secondary battery, applications to a variety of uses represented by a battery pack to be detachably mounted on electronic appliances, an electric vehicle such as electric cars, an electric power storage system such as household electric power servers, and a power tool such as power drills are also investigated.

As the secondary battery, those utilizing a variety of charge and discharge principles are widely proposed. Above all, a secondary battery utilizing intercalation and deintercalation of an electrode reactant is regarded as promising. This is because a higher energy density than that of a lead battery or a nickel-cadmium battery or the like is obtainable.

The secondary battery is equipped with an electrolytic solution as well as a positive electrode and a negative electrode. A positive electrode active material layer of the positive electrode contains, in addition to a positive electrode active material capable of intercalating and deintercalating an electrode reactant, other materials such as a binder. A negative electrode active material layer of the negative electrode contains, in addition to a negative electrode active material capable of intercalating and deintercalating an electrode reactant, other materials such as a binder. The electrolytic solution contains a solvent and an electrolyte salt.

In general, a lithium transition metal complex oxide such as $LiCoO_2$ is used as the positive electrode active material, and also, a carbon material such as graphite is used as the negative electrode active material. In addition, a mixed solvent of a cyclic carbonate that is a high-dielectric solvent and a chain carbonate that is a low-dielectric solvent, or the like is used as a solvent of the electrolytic solution. This mixed solvent is not only a polar solvent capable of sufficiently dissolving or ionically dissociating the electrolyte salt such as $LiPF_6$ but an aprotic solvent capable of rapidly transmitting an ion at the time of charge and discharge.

The electrolytic solution using this mixed solvent tends to exhibit high viscosity and surface tension to be caused due to an interaction by polarity. In that case, if a binder such as polyvinylidene fluoride is contained in the positive electrode active material layer or negative electrode active material layer, the affinity of the electrolytic solution becomes low, and therefore, a penetration rate of the electrolytic solution into the positive electrode active material layer or negative electrode active material layer becomes slow. According to this, a time is required for a penetration work of the electrolytic solution in a manufacturing step of a secondary battery, and therefore, a lowering of the production efficiency is incurred. In addition, the positive electrode or negative electrode into which the electrolytic solution is not sufficiently penetrated is substantially difficult to participate in a charge and discharge reaction, and therefore, a lowering of the battery capacity is also incurred.

Then, in order to improve the penetration properties of the electrolytic solution into the positive electrode or negative electrode, it is proposed to allow a surfactant having a polar segment and a non-polar segment to be contained in the positive electrode or negative electrode or the electrolytic solution (see, for example, Patent Documents 1 (JP-A-1995-263027) and 2 (JP-T-2009-526349)). In that case, for the purpose of feeding an electrode reactant at the time of initial charge and discharge to reduce the irreversible capacity, it is also proposed to use a lithium alkyl carbonate having a carbon number of the alkyl group thereof of from 1 to 4 (see, for example, Patent Document 3 (Japanese Patent No. 4270904)).

SUMMARY

Examples of the surfactant which is generally used for secondary batteries include cationic, anionic, amphoteric, or nonionic surfactants and fluorine based surfactants having a fluorocarbon chain. Since such a surfactant has strong properties of lowering the surface tension, the contact properties (wettability) of the electrolytic solution with the positive electrode active material or negative electrode active material are improved, whereas the oxidation-reduction resistance becomes lower than an aprotic solvent. For that reason, it may not be said that the battery characteristics can be sufficiently improved.

It is therefore desirable to provide a secondary battery, a battery pack, an electric vehicle, an electric power storage system, a power tool, and an electronic appliance, each being capable of obtaining excellent battery characteristics.

An embodiment of the present application is directed to a secondary battery including an electrolytic solution, in addition to a positive electrode and a negative electrode, at least one of the positive electrode, the negative electrode, and the electrolytic solution containing an alkyl carbonate represented by the following formula (1). Another embodiment of the present application is directed to a battery pack, an electric vehicle, an electric power storage system, a power tool, and an electronic appliance each using the foregoing secondary battery of the embodiment of the present application.

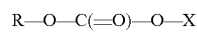

R—O—C(=O)—O—X     (1)

In the formula (1), R is a linear alkyl group or halogenated alkyl group having a carbon number of from 8 to 20, or a branched alkyl group or halogenated alkyl group having a carbon number of from 8 to 20 in a main chain thereof; and X is an alkali metal element.

As for R in the formula (1), the "main chain" in the branched alkyl group or halogenated alky group as referred to herein means a common carbon chain to which one or two or more side chains are bonded. As an example, in the case where R is a 2-butyl-octyl group, not only the main chain is an octyl group (carbon number=8), but the side chain is a butyl group (carbon number=4). In addition, in the case wherein R is a 2-octyl-dodecyl group, not only the main chain is a dodecyl group (carbon number=12), but the side chain is an octyl group (carbon number=8). Incidentally, the "halogenated alkyl group" as referred to herein means one in which at least one hydrogen group of the alkyl group is substituted with a halogen group.

According to the secondary battery of the embodiment of the present application, since at least one of the positive electrode, the negative electrode, and the electrolytic solution contains the alkyl carbonate represented by the formula (1), excellent battery characteristics can be obtained. In addition, according to the battery pack, the electric vehicle, the electric power storage system, the power tool, and the electronic appliance each using the secondary battery of the present application, the same effects can be obtained, too.

Additional features and advantages are described herein, and will be apparent from the following Detailed Description and the figures.

DETAILED DESCRIPTION

Embodiments of the present application are hereunder described in detail by reference to the accompanying drawings. Incidentally, the description is made in the following order.

1. Secondary battery
1-1. Cylindrical type
1-2. Laminated film type
2. Use of secondary battery
2-1. Battery pack
2-2. Electric vehicle
2-3. Electric power storage system
2-4. Power tool <1. Secondary Battery/1-1. Cylindrical Type>

Figure 1:
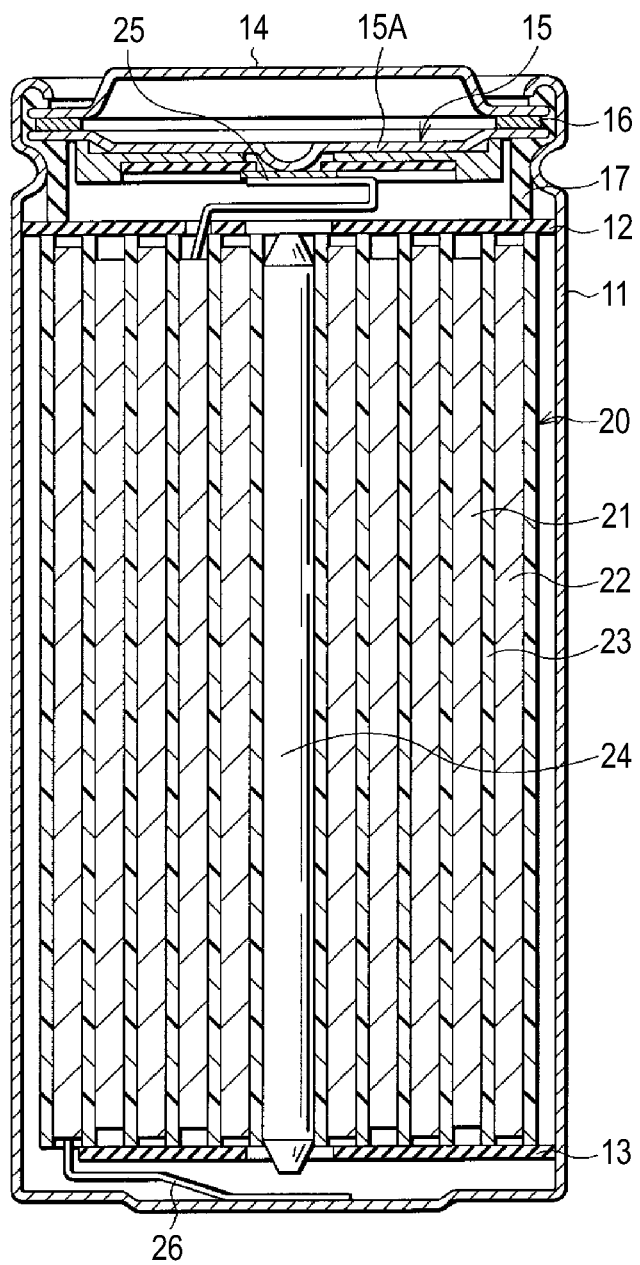
FIG. 1 is a sectional view showing a configuration of a secondary battery (cylindrical type) of an embodiment of the present application.
Figure 2:
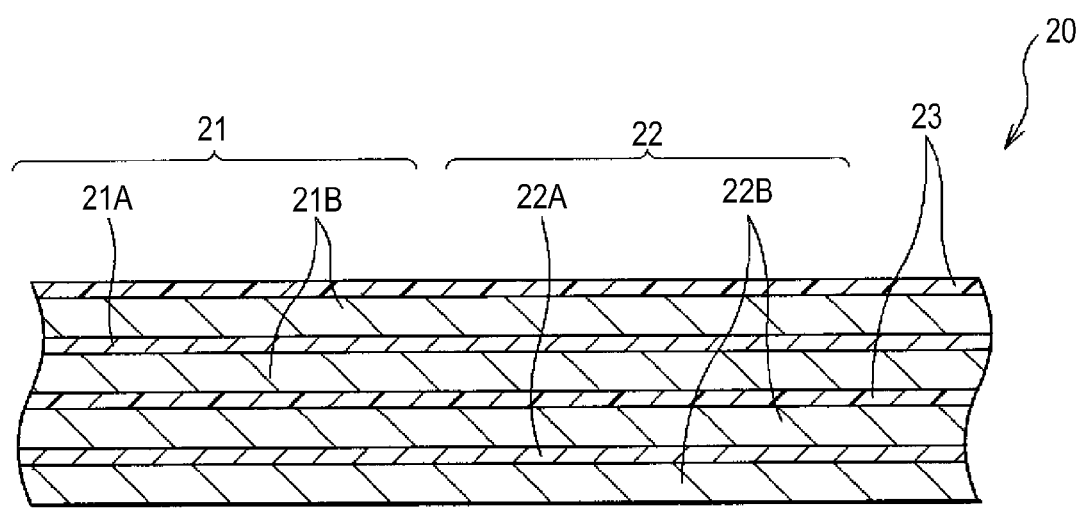
FIG. 2 is a sectional view showing enlargedly a part of a wound electrode body shown in FIG. 1.

Each of FIGS. 1 and 2 shows a sectional configuration of a secondary battery in an embodiment of the present application, in which FIG. 2 shows enlargedly a part of a wound electrode body 20 shown in FIG. 1.

[Entire Configuration of Secondary Battery]

This secondary battery is, for example, a lithium ion secondary battery from which a battery capacity is obtained by intercalation and deintercalation of a lithium ion that is an electrode reactant (the lithium ion secondary battery will be hereinafter referred to simply as "secondary battery").

The secondary battery as described herein is of a so-called cylindrical type. In this secondary battery, a wound electrode body 20 and a pair of insulating plates 12 and 13 are housed in the inside of a substantially hollow columnar battery can 11. The wound electrode body 20 is, for example, one in which a positive electrode 21 and a negative electrode 22 are laminated and wound via a separator 23.

The battery can 11 has a hollow structure in which one end thereof is closed, with the other end being opened and is constituted of, for example, Fe, Al, or an alloy thereof, or the like. Incidentally, Ni or the like may be plated on the surface of the battery can 11. The pair of the insulating plates 12 and 13 is respectively disposed such that they interpose the wound electrode body 20 vertically therebetween and extend perpendicular to the winding peripheral face thereof.

In the open end of the battery can 11, a battery lid 14, a safety valve mechanism 15, and a positive temperature coefficient device (PTC device) 16 are caulked via a gasket 17. According to this, the battery can 11 is hermetically sealed. The battery lid 14 is constituted of, for example, a material the same as that in the battery can 11. The safety valve mechanism 15 and the positive temperature coefficient device 16 are provided in the inside of the battery lid 14, and the safety valve mechanism 15 is electrically connected to the battery lid 14 via the positive temperature coefficient device 16. In this safety valve mechanism 15, when the inner pressure reaches a fixed value or more due to an internal short circuit or heating from the outside or the like, a disc plate 15A is reversed, whereby electrical connection between the battery lid 14 and the wound electrode body 20 is disconnected. The positive temperature coefficient device 16 prevents abnormal heat generation to be caused due to a large current from occurring. In this positive temperature coefficient device 16, the resistance increases in response to an increase of the temperature. The gasket 17 is constituted of, for example, an insulating material, and asphalt may be coated on the surface thereof.

A center pin 24 may be inserted on the center of the wound electrode body 20. A positive electrode lead 25 formed of an electrically conductive material, for example, Al, etc. is connected to the positive electrode 21; and a negative electrode lead 26 formed of an electrically conductive material, for example, Ni, etc. is also connected to the negative electrode 22. The positive electrode lead 25 is electrically connected to the battery lid 14 by means of welding with the safety valve mechanism 15, or the like; and the negative electrode lead 26 is also electrically connected to the battery can 11 by means of welding with the battery can 11, or the like.

[Positive Electrode]

For example, the positive electrode 21 is one in which a positive electrode active material layer 21B is provided on one or both surfaces of a positive electrode collector 21A. The positive electrode collector 21A is formed of an electrically conductive material, for example, Al, Ni, stainless steel, etc.

The positive electrode active material layer 21B contains, as a positive electrode active material, one kind or two or more kinds of positive electrode materials capable of intercalating and deintercalating a lithium ion and may further contain other materials such as a positive electrode binder and a positive electrode electrically conductive agent, as the need arises.

The positive electrode material is preferably a lithium-containing compound. This is because a high energy density is obtainable. Examples of this lithium-containing compound include a complex oxide containing Li and a transition metal element as constituent elements and a phosphate compound containing Li and a transition metal element as constituent elements. Above all, the transition metal element is preferably any one kind or two or more kinds of Co, Ni, Mn, and Fe. This is because a higher voltage is obtainable. A chemical formula thereof is represented by, for example, $Li_xM1O_2$ or $Li_yM2PO_4$. In the formulae, each of M1 and M2 represents one or more kinds of a transition metal element; and values of x and y vary depending upon the charge and discharge state and usually satisfy relationships of (0.05≤x≤1.10) and (0.05≤y≤1.10).

Examples of the complex oxide containing Li and a transition metal element include $Li_xCoO_2$, $Li_xNiO_2$, and an LiNi based complex oxide represented by the following formula (10). Examples of the phosphate compound containing Li and a transition metal element include $LiFePO_4$ and $LiFe_{1-u}Mn_uPO_4$ (u<1). This is because a high battery capacity is obtainable, and an excellent cycle characteristic is also obtainable. Incidentally, the positive electrode material may be other materials than those described above.

$$LiNi_{1-z}M_zO_2 \quad (10)$$

In the formula (10), M represents at least one member selected from the group consisting of Co, Mn, Fe, Al, V, Sn, Mg, Ti, Sr, Ca, Zr, Mo, Tc, Ru, Ta, W, Re, Yb, Cu, Zn, Ba, B, Cr, Si, Ga, P, Sb, and Nb; and z satisfies a relationship of (0.005<z<0.5).

Besides, the positive electrode material may be, for example, an oxide, a disulfide, a chalcogenide, or an electrically conductive polymer. Examples of the oxide include titanium oxide, vanadium oxide, and manganese dioxide. Examples of the disulfide include titanium disulfide and molybdenum sulfide. Examples of the chalcogenide include niobium selenide. Examples of the electrically conductive polymer include sulfur, polyaniline, and polythiophene.

The positive electrode binder may contain any one kind or two or more kinds of, for example, synthetic rubbers or polymer materials, or the like. Examples of the synthetic rubber include a styrene butadiene based rubber, a fluorine based rubber, and an ethylene propylene diene based rubber. Examples of the polymer material include polyvinylidene fluoride and polyimide.

The positive electrode electrically conductive agent contains any one kind or two or more kinds of, for example, carbon materials. Examples of the carbon material include graphite, carbon black, acetylene black, and ketjen black. Incidentally, the positive electrode electrically conductive agent may be a metal material, an electrically conductive polymer, or the like so far as it is a material having electrical conductivity.

[Negative Electrode]

For example, the negative electrode 22 is one in which a negative electrode active material layer 22B is provided on one or both surfaces of a negative electrode collector 22A.

The negative electrode collector 22A is formed of an electrically conductive material, for example, Cu, Ni, stainless steel, etc. It is preferable that the surface of this negative electrode collector 22A is roughed. This is because adhesion of the negative electrode active material layer 22B to the negative electrode collector 22A is enhanced due to a so-called anchor effect. In that case, the surface of the negative electrode collector 22A may be roughed in at least a region opposing to the negative electrode active material layer 22B. Examples of a method for achieving roughing include a method through forming fine particles by an electrolysis treatment. The electrolysis treatment as referred to herein is a method in which fine particles are formed on the surface of the negative electrode collector 22A in an electrolysis vessel by means of electrolysis, thereby providing recesses and projections. A copper foil which is fabricated by the electrolysis is generally called "electrolytic copper foil".

The negative electrode active material layer 22B contains, as a negative electrode active material, any one kind or two or more kinds of a negative electrode material capable of intercalating and deintercalating a lithium ion and may contain other materials such as a negative electrode binder and a negative electrode electrically conductive agent, as the need arises. Incidentally, details regarding the negative electrode binder and the negative electrode electrically conductive agent are, for example, the same as those regarding the positive electrode binder and the positive electrode electrically conductive agent, respectively. In this negative electrode active material layer 22B, for example, for the purpose of preventing deposition of the Li metal without intention from occurring at the time of charge and discharge, it is preferable that the chargeable capacity of the negative electrode material is larger than the discharge capacity of the positive electrode 21.

The negative electrode material is, for example, a carbon material. This is because a change in a crystal structure at the time of intercalation and deintercalation of a lithium ion is very small, and therefore, a high energy density and an excellent cycle characteristic are obtainable, and the carbon material also functions as a negative electrode electrically conductive agent. Examples of this carbon material include easily graphitized carbon, hardly graphitized carbon with a (002) plane interval of 0.37 nm or more, and graphite with a (002) plane interval of not more than 0.34 nm. More specifically, there are exemplified pyrolytic carbons, cokes, vitreous carbon fibers, organic polymer compound baked materials, active carbon, and carbon blacks. Of these, examples of the cokes include pitch coke, needle coke, and petroleum coke. The organic polymer compound baked material is a material obtained by baking (carbonizing) a polymer compound such as a phenol resin and a furan resin at an appropriate temperature. Besides, the carbon material may be lowly crystalline carbon or amorphous carbon having been heat treated at not higher than about 1,000° C. Incidentally, the shape of the carbon material may be any of a fibrous shape, a spherical shape, a granular shape, or a flaky shape.

In addition, the negative electrode material is, for example, a material (metal based material) containing, as a constituent element, any one kind or two kinds of metal elements or semi-metal elements. This is because a high energy density is obtainable. Such a metal based material may be a simple substance, an alloy, or a compound, or it may be two or more kinds thereof. Also, it may be one having one kind or two or more kinds of phases in at least a part thereof. Incidentally, the alloy includes, in addition to materials composed of two or more kinds of metal elements, materials containing one or more kinds of metal elements and one or more kinds of semi-metal elements. In addition, the alloy may contain a non-metal element. Examples of its texture include a solid solution, a eutectic (eutectic mixture), an intermetallic compound, and one in which two or more kinds thereof coexist.

Examples of the metal element or semi-metal element include a metal element or a semi-metal element capable of forming an alloy together with Li. Specifically, the metal element or semi-metal element is one kind or two or more kinds of the following elements. That is, examples thereof include Mg, B, Al, Ga, In, Si, Ge, Sn, Pb, Bi, Cd, Ag, Zn, Hf, Zr, Y, Pd, and Pt. Above all, at least one of Si and Sn is preferable. This is because Si and Sn have excellent ability to intercalate and deintercalate a lithium ion, and therefore, a high energy density is obtainable.

The material containing at least one of Si and Sn may be a simple substance, an alloy, or a compound of Si or Sn, or it may be two or more kinds thereof. Also, the material may be one having one kind or two or more kinds of phases in at least a part thereof. Incidentally, the "simple substance" as referred to herein is a simple substance in a general meaning to the bitter end (may contain a trace amount of impurities), and it is not always meant that the purity is 100%.

The alloy of Si is a material containing, for example, one kind or two or more kinds of the following elements as a constituent element other than Si. That is, examples thereof include Sn, Ni, Cu, Fe, Co, Mn, Zn, In, Ag, Ti, Ge, Bi, Sb, and Cr. Examples of the compound of Si include materials containing C or O as a constituent element other than Si. Incidentally, the compound of Si may contain, for example, any one kind or two or more kinds of the elements described above regarding the alloy of Si as a constituent element other than Si.

Examples of the alloy or compound of Si include the following materials. That is, examples thereof include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, and $TaSi_2$. Also, examples thereof include $VSi_2$, $WSi_2$, $ZnSi_2$, $SiC$, $Si_3N_4$, $Si_2N_2O$, $SiO_v$ (0<v≤2), and LiSiO. Incidentally, v in $SiO_v$ may satisfy a relationship of (0.2<v<1.4).

The alloy of Sn is a material containing, for example, one kind or two or more kinds of the following elements as a constituent element other than Sn. That is, examples thereof include Si, Ni, Cu, Fe, Co, Mn, Zn, In, Ag, Ti, Ge, Bi, Sb, and Cr. Examples of the compound of Sn include materials containing C or O as the constituent element other than Sn. Incidentally, the compound of Sn may contain, for example, any one kind or two or more kinds of the elements described above regarding the alloy of Sn as a constituent element other than Sn. Examples thereof include $SnO_w$ (0<w≤2), $SnSiO_3$, LiSnO, and $Mg_2Sn$.

In addition, as the material containing Sn, for example, a material containing Sn as a first constituent element and in addition to this, second and third constituent elements is preferable. The second constituent element is, for example, one kind or two or more kinds of the following elements. That is, examples thereof include Co, Fe, Mg, Ti, V, Cr, Mn, Ni, Cu, Zn, Ga, Zr, Nb, Mo, Ag, In, Ce, Hf, Ta, W, Bi, and Si. The third constituent element is, for example, one kind or two or more kinds of B, C, Al, and P. This is because when the second and third constituent elements are contained, a high battery capacity and an excellent cycle characteristic, and the like are obtainable.

Above of all, a material containing Sn, Co, and C (SnCoC-containing material) is preferable. For example, the SnCoC-containing material has a composition having a content of C of from 9.9% by mass to 29.7% by mass and a proportion of contents of Sn and Co (Co/(Sn+Co)) of from 20% by mass to 70% by mass. This is because a high energy density is obtainable in the foregoing composition range.

Such an SnCoC-containing material has a phase containing Sn, Co, and C, and this phase is preferably lowly crystalline or amorphous. This phase is a reaction phase which is reactive with Li, and excellent characteristics are obtainable due to the presence of the reaction phase. In the case of using CuKα-rays as specified X-rays and defining a sweep rate at 1°/min, a half width of a diffraction peak obtained by X-ray diffraction of this phase is preferably 1° or more in terms of a diffraction angle 2θ. This is because not only a lithium ion is more smoothly intercalated and deintercalated, but the reactivity with an electrolytic solution is reduced. Incidentally, there may be the case where the SnCoC-containing material contains, in addition to the lowly crystalline or amorphous phase, a phase containing a simple substance or a part of the constituent elements.

Whether or not the diffraction peak obtained by the X-ray diffraction is corresponding to the reaction phase which is reactive with Li can be easily determined by comparing X-ray diffraction charts before and after an electrochemical reaction with Li. For example, when a position of the diffraction peak changes before and after the electrochemical reaction with Li, it is determined that the diffraction peak is corresponding to the reaction phase which is reactive with Li. In that case, for example, a diffraction peak of a lowly crystalline or amorphous reaction phase is observed in the range of from 20° to 50° in terms of 2θ. Such a reaction phase contains, for example, the foregoing respective constituent elements, and it may be considered that this phase is lowly crystallized or amorphized chiefly due to the presence of C.

In the SnCoC-containing material, it is preferable that at least a part of C that is the constituent element is bonded to the metal element or semi-metal element that is other constituent element. This is because aggregation or crystallization of Sn or the like is suppressed. The bonding state of elements can be confirmed by, for example, X-ray photoelectron spectroscopy (XPS). In commercially available apparatuses, for example, Al—Kα rays or Mg—Kα rays, or the like are used as soft X-rays. In the case where at least a part of C is bonded to the metal element or semi-metal element or the like, a peak of a combined wave of a 1s orbit of C (C1s) appears in a region lower than 284.5 eV. Incidentally, the energy is considered to be calibrated such that a peak of a 4f orbit of an Au atom (Au4f) is obtained at 84.0 eV. On that occasion, in general, since surface contamination carbon exists on the surface of a material, the peak of C1s of the surface contamination carbon is fixed at 284.8 eV, and this peak is used as an energy reference. In the XPS measurement, since a waveform of the peak of C1s is obtained as a form including the peak of the surface contamination carbon and the peak of C in the SnCoC-containing material, the peaks of the both are separated from each other by means of analysis using, for example, a commercially available software program. In the analysis of the waveform, the position of a main peak existing on the side of a lowest binding energy is used as an energy reference (284.8 eV).

Incidentally, the SnCoC-containing material may further contain other constituent elements, as the need arises. Such other constituent element is, for example, any one kind or two or more kinds of Si, Fe, Ni, Cr, In, Nb, Ge, Ti, Mo, Al, P, Ga, and Bi.

In addition to this SnCoC-containing material, a material containing Sn, Co, Fe, and C (SnCoFeC-containing material) is also preferable. A composition of this SnCoFeC-containing material can be arbitrarily set up. For example, in the case where a content of Fe is set up low, its composition is one in which the content of C is from 9.9% by mass to 29.7% by mass, the content of Fe is from 0.3% by mass to 5.9% by mass, and a proportion of the contents of Sn and Co (Co/(Sn+Co)) is from 30% by mass to 70% by mass. In addition, for example, in the case where the content of Fe is set up high, its composition is one in which the content of C is from 11.9% by mass to 29.7% by mass, a proportion of the contents of Sn, Co, and Fe ((Co+Fe)/(Sn+Co+Fe)) is from 26.4% by mass to 48.5% by mass, and a proportion of the contents of Co and Fe (Co/(Co+Fe)) is from 9.9% by mass to 79.5% by mass. This is because a high energy density is obtainable in the foregoing composition range. Physical properties (for example, a half width, etc.) of this SnCoFeC-containing material are the same as those in the foregoing SnCoC-containing material.

Besides, the negative electrode material may be, for example, a metal oxide or a polymer compound. Examples of the metal oxide include iron oxide, ruthenium oxide, and molybdenum oxide. Examples of the polymer compound include polyacetylene, polyaniline, and polypyrrole.

The negative electrode active material layer 22B may be, for example, formed by a coating method, a vapor phase method, a liquid phase method, a spraying method, or a baking method (sintering method), or a combined method of two or more kinds of these methods. The coating method as referred to herein is, for example, a method in which after mixing a granular negative electrode active material with a binder and the like, the mixture is dispersed in a solvent such as an organic solvent and coated. Examples of the vapor phase method include a physical deposition method and a chemical deposition method. Specific examples thereof include a vacuum vapor deposition method, a sputtering method, an ion plating method, a laser abrasion method, a thermal chemical vapor deposition method, a chemical vapor deposition (CVD) method, and a plasma chemical vapor deposition method. Examples of the liquid phase method include an electrolytic plating method and a non-electrolytic plating method. The spraying method as referred to herein is a method of spraying a negative electrode active material in a molten state or a semi-molten state. The baking method as referred to herein is, for example, a method in which after coating in the same procedure as that in the coating method, the coated material is heat treated at a higher temperature than a melting point of the binder or the like. As for the baking method, known techniques can be adopted. Examples thereof include an atmospheric baking method, a reaction baking method, and a hot press baking method.

In this secondary battery, as described above, for the purpose of preventing deposition of the Li metal on the negative electrode 22 without intention from occurring on the way of charge, an electrochemical equivalent of the negative electrode material capable of intercalating and deintercalating a lithium ion is larger than an electrochemical equivalent of the positive electrode. In addition, when an open circuit voltage (namely, a battery voltage) at the time of complete charge is 4.25 V or more, even in the same positive electrode active material, the deintercalation amount of a lithium ion per unit mass becomes large as compared with the case of 4.20 V. Therefore, the amounts of the positive electrode active material and the negative electrode active material are adjusted in response thereto. According to this, a high energy density is obtainable.

[Separator]

The separator 23 partitions the positive electrode 21 and the negative electrode 22 from each other and allows a lithium ion to pass therethrough while preventing a short circuit of the current to be caused due to the contact of the both electrodes from occurring. This separator 23 is, for example, constituted of a porous film made of a synthetic resin or a ceramic, and it may also be a laminated film obtained by laminating two or more kinds of porous films. Examples of the synthetic resin include polytetrafluoroethylene, polypropylene, and polyethylene.

In particular, the separator 23 may include, for example, a substrate layer made of the foregoing porous film and a polymer compound layer provided on at least one surface of the substrate layer. This is because the adhesion of the separator 23 to each of the positive electrode 21 and the negative electrode 22 is enhanced, and therefore, the strain of the wound electrode body 20 is suppressed. According to this, not only the decomposition reaction of the electrolytic solution is suppressed, but the liquid leakage of the electrolytic solution impregnated in the substrate layer is suppressed. Therefore, even when the charge and discharge are repeated, not only the resistance of the secondary battery hardly increases, but the battery swelling is suppressed.

The polymer compound layer contains, for example, a polymer material such as polyvinylidene fluoride. This is because it is not only excellent in the physical strength but electrochemically stable. However, the polymer material may be other material than polyvinylidene fluoride. This polymer compound layer is formed by, for example, after preparing a solution having a polymer material dissolved therein, coating the solution on the surface of the substrate layer, or dipping the substrate layer in the solution, followed by drying.

[Electrolytic Solution]

This separator 23 is impregnated with an electrolytic solution that is a liquid electrolyte. This electrolytic solution contains, in addition to a solvent and an electrolyte salt, other materials such as additives, as the need arises.

For example, the solvent contains any one kind or two or more kinds of nonaqueous solvents such as organic solvents. Examples of the nonaqueous solvent include ethylene carbonate, propylene carbonate, butylene carbonate, dimethyl carbonate, diethyl carbonate, ethylmethyl carbonate, methylpropyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, methyl trimethylacetate, ethyl trimethylacetate, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, and dimethyl sulfoxide. This is because excellent battery capacity, cycle characteristic, and storage characteristic, and the like are obtainable.

Above all, at least one member selected from the group consisting of ethylene carbonate, propylene carbonate, dimethyl carbonate, diethyl carbonate, and ethylmethyl carbonate is preferable. This is because more excellent characteristics are obtainable. In that case, a combination of a solvent with a high viscosity (high dielectric constant) (for example, relative dielectric constant $\in \geq 30$), such as ethylene carbonate and propylene carbonate, and a solvent with a low viscosity (for example, viscosity$\leq 1$ mPa·s), such as dimethyl carbonate, ethylmethyl carbonate, and diethyl carbonate, is more preferable. This is because dissociation properties of the electrolyte salt and the mobility of the ion are enhanced.

In particular, it is preferable that the solvent contains a cyclic carbonate having one or two or more unsaturated carbon bonds (unsaturated cyclic carbonate). This is because a stable protective film is formed on the surface of the negative electrode 22 at the time of charge and discharge, and therefore, a decomposition reaction of the electrolytic solution is suppressed. Examples of the unsaturated cyclic carbonate include vinylene carbonate(1,3-dioxol-2-one), methyl vinylene carbonate(4-methyl-1,3-dioxol-2-one), ethyl vinylene carbonate(4-ethyl-1,3-dioxol-2-one), 4,5-dimethyl-1,3-dioxol-2-one, 4,5-diethyl-1,3-dioxol-2-one, 4-fluoro-1,3-dioxol-2-one, and 4-trifluoromethyl-1,3-dioxol-2-one. Incidentally, a content of the unsaturated cyclic carbonate in the solvent is, for example, from 0.01% by weight to 10% by weight. This is because a decomposition reaction of the electrolytic solution is suppressed without excessively lowering the battery capacity.

In addition, it is preferable that the solvent contains at least one of a halogenated chain carbonate and a halogenated cyclic carbonate. This is because a stable coating film is formed on the surface of the negative electrode 22 at the time of charge and discharge, and therefore, a decomposition reaction of the electrolytic solution is suppressed. The halogenated chain carbonate as referred to herein is a chain carbonate containing one or two or more halogens as a constituent element. In other words, the halogenated chain carbonate is a chain carbonate in which at least one H is substituted with a halogen. The halogenated cyclic carbonate as referred to herein is a cyclic carbonate containing one or two or more halogens as a constituent element. In other words, the halogenated cyclic carbonate is a cyclic carbonate in which at least one H is substituted with a halogen.

The kind of the halogen is not particularly limited. Above all, F, Cl, and Br are preferable, and F is more preferable. This is because high effects are obtainable as compared with other halogens. However, as for the number of halogens, 2 is more preferable than 1, and furthermore, the number of halogens may be 3 or more. This is because the ability of forming a protective film is high, and a firmer and more stable coating film is formed, and therefore, a decomposition reaction of the electrolytic solution is more suppressed.

Examples of the halogenated chain carbonate include fluoromethyl methyl carbonate, bis(fluoromethyl)carbonate, and difluoromethyl methyl carbonate. Examples of the halogenated cyclic carbonate include 4-fluoro-1,3-dioxolan-2-one, 4-chloro-1,3-dioxolan-2-one, 4,5-difluoro-1,3-dioxolan-2-one, tetrafluoro-1,3-dioxolan-2-one, 4-fluoro-5-chloro-1,3-dioxolan-2-one, 4,5-dichloro-1,3-dioxolan-2-one, tetrachloro-1,3-dioxolan-2-one, 4,5-bistrifluoromethyl-1,3-dioxolan-2-one, 4-trifluoromethyl-1,3-dioxolan-2-one, 4,5-difluoro-4,5-dimethyl-1,3-dioxolan-2-one, 4-methyl-5,5-difluoro-1,3-dioxolan-2-one, 4-ethyl-5,5-difluoro-1,3-dioxolan-2-one, 4-trifluoromethyl-5-fluoro-1,3-dioxolan-2-one, 4-trifluoromethyl-5-methyl-1,3-dioxolan-2-one, 4-fluoro-4,5-dimethyl-1,3-dioxolan-2-one, 4,4-difluoro-5-(1,1-difluoroethyl)-1,3-dioxolan-2-one, 4,5-dichloro-4,5-dimethyl-1,3-dioxolane-2-one, 4-ethyl-5-fluoro-1,3-dioxolan-2-one, 4-ethyl-4,5-difluoro-1,3-dioxolan-2-one, 4-ethyl-4,5,5-trifluoro-1,3-dioxolan-2-one, and 4-fluoro-4-methyl-1,3-dioxolan-2-one. These halogenated cyclic carbonates also include geometric isomers thereof. Incidentally, a total content of the halogenated chain carbonate and the halogenated cyclic carbonate in the solvent is, for example, from 0.01% by weight to 50% by weight. This is because a decomposition reaction of the electrolytic solution is suppressed without lowering the battery capacity.

In addition, the solvent may contain a sultone (a cyclic sulfonate). This is because the chemical stability of the electrolytic solution is enhanced. Examples of the sultone include propane sultone and propene sultone. Incidentally, though a content of the sultone in the solvent is not particularly limited, it is, for example, from 0.5% by weight to 5% by weight. This is because a decomposition reaction of the electrolytic solution is suppressed without excessively lowering the battery capacity.

Furthermore, the solvent may contain an acid anhydride. This is because the chemical stability of the electrolytic solution is more enhanced. Examples of the acid anhydride include dicarboxylic anhydrides, disulfonic anhydrides, and carboxylic sulfonic anhydrides. Examples of the dicarboxylic anhydride include succinic anhydride, glutaric anhydride, and maleic anhydride. Examples of the disulfonic anhydride include ethanedisulfonic anhydride and propanedisulfonic anhydride. Examples of the carboxylic sulfonic anhydride include sulfobenzoic anhydride, sulfopropionic anhydride, and sulfobutyric anhydride. Incidentally, though a content of the acid anhydride in the solvent is not particularly limited, it is, for example, from 0.5% by weight to 5% by weight. This is because a decomposition reaction of the electrolytic solution is suppressed without excessively lowering the battery capacity.

[Electrolyte Salt]

For example, the electrolyte salt contains any one kind or two or more kinds of the following lithium salts. However, the electrolyte salt may be other salt than the lithium salt (for example, light metal salts other than the lithium salt).

Examples of the lithium salt include $LiPF_6$, $LiBF_4$, $LiClO_4$, $LiAsF_6$, $LiB(C_6H_5)_4$, $LiCH_3SO_3$, $LiCF_3SO_3$, $LiAlCl_4$, $Li_2SiF_6$, LiCl, and LiBr. This is because excellent battery capacity, cycle characteristic, and storage characteristic, and the like are obtainable.

Above all, at least one member selected from the group consisting of $LiPF_6$, $LiBF_4$, $LiClO_4$, and $LiAsF_6$ is preferable, and $LiPF_6$ is more preferable. This is because the internal resistance is lowered, and therefore, higher effects are obtainable.

A content of the electrolyte salt is preferably 0.3 mol/kg or more and not more than 3.0 mol/kg relative to the solvent. This is because high ionic conductivity is obtainable.

[Alkyl Carbonate]

In this secondary battery, at least one of the positive electrode 21, the negative electrode 22, and the electrolytic solution contains any one kind or two or more kinds of an alkyl carbonate represented by the following formula (1) (hereinafter also referred to simply as "alkyl carbonate").

$$R\text{—}O\text{—}C(=O)\text{—}O\text{—}X \tag{1}$$

In the formula (1), R is a linear alkyl group or halogenated alkyl group having a carbon number of from 8 to 20, or a branched alkyl group or halogenated alkyl group having a carbon number of from 8 to 20 in a main chain thereof; and X is an alkali metal element.

The alkyl carbonate is an alkali metal carbonate in which the carbon number of R in the formula (1), namely, the carbon number in the linear alkyl group or the like, or the carbon number of the main chain in the branched alkyl group or the like, falls within a prescribed range. This alkyl carbonate functions as a surfactant because it has a polar segment (—O—C(=O)—O—X) and a non-polar segment (R—) in one molecule.

The reason why the positive electrode 21 or the like contains an alkyl carbonate resides in the matter that in the relation between a role of the surfactant within the secondary battery (surface active function) and an influence of this function against the battery characteristics, a balance between the polar segment and the non-polar segment is made appropriate. According to this, as compared with the case where the positive electrode 21 or the like does not contain an alkyl carbonate, or the case where though the positive electrode 21 or the like contains an alkyl carbonate, the carbon number of R falls outside the foregoing range, a high discharge capacity is obtainable since the time of initial charge and discharge. In addition, even when the charge and discharge are repeated, not only the discharge capacity hardly decreases, but the resistance hardly increases. Accordingly, excellent battery characteristics are obtainable.

In detail, in the alkyl carbonate, in general, as the carbon number of R that is the non-polar segment increases, the hydrophobicity increases and the hydrophilicity decreases, and therefore, the function as the surfactant is enhanced. On the other hand, not only the solvent of the electrolytic solution is generally a polar solvent, but a forming material of each of the positive electrode active material layer 21B and the negative electrode active material layer is generally non-polar (hydrophobic). This forming material is, for example, a positive electrode active material, a negative electrode active material, a binder, an electrically conductive agent, or the like. For that reason, when the alkyl carbonate functioning as a surfactant is present together with the positive electrode active material layer 21B or the like and the electrolytic solution, not only the electrolytic solution is easy to come into contact with (penetrate into) the positive electrode active material layer 21B or the like through the alkyl carbonate, but the affinity of the electrolytic solution with the positive electrode active material or the like is enhanced.

In that case, in particular, when the carbon number of R is 8 or more, a sufficient function to reduce the surface tension by the surfactant is exhibited, and therefore, the penetration properties and affinity of the electrolytic solution relative to each of the positive electrode 21 and the negative electrode 22 are tremendously enhanced. According to this, a high discharge capacity is obtainable since the time of initial charge and discharge. Moreover, a time required for an impregnation work of the electrolytic solution regarding each of the positive electrode 21 and the negative electrode 22 in the manufacturing process of a secondary battery may be short. On the other hand, when the carbon number of R is not more than 20, excellent oxidation-reduction resistance is obtainable as compared with an aprotic solvent, and therefore, the chemical stability of the alkyl carbonate is enhanced. According to this, the generation of a gas, or the like to be caused due to the decomposition reaction of the alkyl carbonate is suppressed, and therefore, even when the charge and discharge are repeated, not only the discharge capacity hardly decreases, but the resistance hardly increases. Accordingly, when the carbon number of R is from 8 to 20, the penetration properties of the electrolytic solution into the positive electrode active material layer 21B or the like can be enhanced while suppressing the decomposition reaction of the alkyl carbonate.

The kind of R in the formula (1) is not particularly limited so far as it is a linear alkyl group or halogenated alkyl group having a carbon number of from 8 to 20, or a branched alkyl group or halogenated alkyl group having a carbon number of from 8 to 20 in a main chain thereof.

The linear alkyl group having a carbon number of from 8 to 20 is an octyl group ($-C_8H_{17}$), a nonyl group ($-C_9H_{19}$), a decyl group ($-C_{10}H_{21}$), an undecyl group ($-C_{11}H_{23}$), a dodecyl group ($-C_{12}H_{25}$), a tridecyl group ($-C_{13}H_{27}$), a tetradecyl group ($-C_{14}H_{29}$), a pentadecyl group ($-C_{15}H_{31}$), a hexadecyl group ($-C_{16}H_{33}$), a heptadecyl group ($-C_{17}H_{35}$), an octadecyl group ($-C_{18}H_{37}$), a nonadecyl group ($-C_{19}H_{39}$), or an eicosyl group ($-C_{20}H_{41}$).

The branched alkyl group having a carbon number of from 8 to 20 in a main chain thereof is one in which the hydrogen group (—H) of at least a part of the foregoing series of linear alkyl groups (main chains) is substituted with an alkyl group (side chain). The number of the side chain may be 1 or 2 or more. In addition, the position at which the side chain is bonded to the main chain may be arbitrary. The "main chain" in this branched alkyl group as referred to herein is a common carbon chain to which one or two or more side chains are bonded.

Incidentally, the "halogenated alkyl group" as referred to herein is one in which the hydrogen group of at least a part of the foregoing linear or branched alkyl group is substituted with a halogen group. Though the kind of the halogen group is not particularly limited, examples thereof include a fluorine group (—F), a chlorine group (—Cl), a bromine group (—Br), and an iodine group (—I). These halogen groups may be one kind or two or more kinds thereof.

Above of all, a total carbon number of the branched alkyl group or halogenated alkyl group is preferably not more than 20. This is because the balance between the polar segment and the non-polar segment is made appropriate, and therefore, higher effects are obtainable.

The kind of X in the formula (1) is not particularly limited so far as it is an alkali metal element. Examples thereof include Li, Na, K, and Rb. Above all, X is preferably an element the same as that in the electrode reactant which is used for the charge and discharge in the secondary battery, and for example, in the lithium ion secondary battery, X is preferably Li. This is because even when a lithium ion deintercalated from the positive electrode 12 at the time of charge and discharge is inactivated at the negative electrode 22, a lithium ion is replenished from the alkyl carbonate, and therefore, even if the charge and discharge are repeated, a lowering of the discharge capacity is suppressed. In particular, even after the initial charge at which the lithium ion is easily consumed for the purpose of forming an SEI film or the like, an absolute amount of the lithium ion is ensured, so that a high discharge capacity is obtainable since the initial stage.

Specific examples of the alkyl carbonate are as follows. The linear alkyl carbonate is preferably at least one member selected from the group consisting of lithium octyl carbonate, lithium nonyl carbonate, lithium decyl carbonate, lithium undecyl carbonate, lithium dodecyl carbonate, lithium tridecyl carbonate, lithium tetradecyl carbonate, lithium pentadecyl carbonate, lithium hexadecyl carbonate, lithium heptadecyl carbonate, lithium octadecyl carbonate, lithium nonadecyl carbonate, lithium eicosyl carbonate, and halides thereof. The "halide" as referred to herein is an alkyl carbonate having a halogenated alkyl group as R, and more specifically, is one in which at least one hydrogen group of the foregoing lithium octyl carbonate or the like is substituted with a halogen group. Specific examples of the halide include lithium perfluorooctyl carbonate, lithium 1H,1H-pentadecafluorooctyl carbonate, and lithium 6-(perfluoroethyl)hexyl carbonate.

The branched alkyl carbonate is, for example, at least one member selected from the group consisting of lithium 2-butyl-octyl carbonate, lithium 2-hexyl-decyl carbonate, lithium 2-octyl-dodecyl carbonate, and halides thereof. Specific examples of the halide include lithium 2-perfluorobutyl-octyl carbonate and lithium 1-perfluoromethyl-octyl carbonate.

In the case where the electrolytic solution contains the alkyl carbonate, the electrolytic solution contains the alkyl carbonate together with the solvent and the electrolyte salt. Though a content of the alkyl carbonate in the electrolytic solution is not particularly limited, it is, for example, from 0.005% by weight to 2% by weight. This is because excellent battery characteristics are obtainable.

In the case where the positive electrode 21 contains the alkyl carbonate, for example, the positive electrode active material layer 21B contains the alkyl carbonate together with the positive electrode active material and the like. In addition, in the case where the negative electrode 22 contains the alkyl carbonate, for example, the negative electrode active material layer 22B contains the alkyl carbonate together with the negative electrode active material and the like. Though a content of the alkyl carbonate in the positive electrode active material layer 21B or the negative electrode active material layer 22B is not particularly limited, it is, for example, from 0.5% by weight to 1% by weight. This is because excellent battery characteristics are obtainable.

As described above, the alkyl carbonate may be contained in at least one of the positive electrode 21, the negative electrode 22, and the electrolytic solution. For that reason, the place at which the alkyl carbonate is contained may be any one of the positive electrode 21, the negative electrode 22, and the electrolytic solution, or may be two of an arbitrary combination or all of three. In that case, the larger the number of places at which the alkyl carbonate is contained, the higher the obtainable effect is.

[Motion of Secondary Battery]

In this secondary battery, for example, the lithium ion deintercalated from the positive electrode 21 at the time of charge is intercalated in the negative electrode 22 through the electrolytic solution, and the lithium ion deintercalated from the negative electrode 22 at the time of discharge is intercalated in the positive electrode 21 through the electrolytic solution.

[Manufacturing Method of Secondary Battery]

This secondary battery is, for example, manufactured according to the following procedures.

First of all, the positive electrode 21 is fabricated. A positive electrode active material and optionally, an alkyl carbonate, a positive electrode binder, and a positive electrode electrically conductive agent, etc. are mixed to form a positive electrode mixture. Subsequently, the positive electrode mixture is dispersed in an organic solvent or the like to prepare a positive electrode mixture slurry in a paste form. Subsequently, the positive electrode mixture slurry is applied on the both surfaces of the positive electrode collector 21A and then dried to form the positive electrode active material layer 21B. Subsequently, the positive electrode active material layer 21B is compression molded using a roll press or the like while optionally heating. In that case, the compression molding may be repeated plural times.

In addition, the negative electrode 22 is fabricated according to the same procedures as those in the foregoing positive electrode 21. A negative electrode active material and optionally, an alkyl carbonate, a negative electrode binder, and a negative electrode electrically conductive agent, etc. are mixed to form a negative electrode mixture, which is then dispersed in an organic solvent or the like to prepare a negative electrode mixture slurry in a paste form. Subsequently, the negative electrode mixture slurry is applied on the both surfaces of the negative electrode collector 22A and then dried to form the negative electrode active material layer 22B, followed by compression molding of the negative electrode active material layer 22B, as the need arises.

Furthermore, an electrolyte salt is dispersed in a solvent, and an alkyl carbonate is further added, as the needs arises, thereby preparing an electrolytic solution.

Finally, a secondary battery is assembled using the positive electrode 21 and the negative electrode 22. First of all, the positive electrode lead 25 is installed in the positive electrode collector 21A, and the negative electrode lead 26 is also installed in the negative electrode collector 22A, by adopting a welding method or the like. Subsequently, the positive electrode 21 and the negative electrode 22 are laminated via the separator 23 and then wound to fabricate the wound electrode body 20, and the center pin 24 is then inserted into the winding center thereof. Subsequently, the wound electrode body 20 is housed in the inside of the battery can 11 while being interposed between a pair of the insulating plates 12 and 13. In that case, a tip portion of the positive electrode lead 25 is installed in the safety valve mechanism 15, and a tip portion of the negative electrode lead 26 is also installed in the battery can 11, by adopting a welding method or the like. Subsequently, the electrolytic solution is injected into the inside of the battery can 11 and the separator 23 is impregnated with the electrolytic solution. Subsequently, the battery lid 14, the safety valve mechanism 15, and the positive temperature coefficient device 16 are caulked in the open end portion of the battery can 11 via the gasket 17.

[Actions and Effects of Secondary Battery]

According to this secondary battery of a cylindrical type, at least one of the positive electrode 21, the negative electrode 22, and the electrolytic solution contains the alkyl carbonate represented by the formula (1). In that case, as described above, the balance between the polar segment and the non-polar segment of the alkyl carbonate which functions as a surfactant is made appropriate, and therefore, a high discharge capacity is obtainable since the time of initial charge and discharge. In addition, even when the charge and discharge are repeated, not only the discharge capacity hardly decreases, but the resistance hardly increases. Accordingly, excellent battery characteristics can be obtained.

In particular, in the case where R represented in the formula (1) is a branched alkyl group or halogenated alkyl group, so far as a total carbon number thereof is not more than 20, higher effects can be obtained. In addition, in the case of a lithium ion secondary battery, when the alkyl carbonate is an Li salt, a lithium ion is replenished from the alkyl carbonate at the time of charge and discharge, and therefore, higher effects can be obtained.

In addition, so far as the content of the alkyl carbonate in the electrolytic solution is from 0.005% by weight to 2% by weight, or the content of the alkyl carbonate in the positive electrode active material layer 21B or the negative electrode active material layer 22B is from 0.5% by weight to 1% by weight, higher effects can be obtained.

<1-2. Laminated Film Type>

Figure 3:
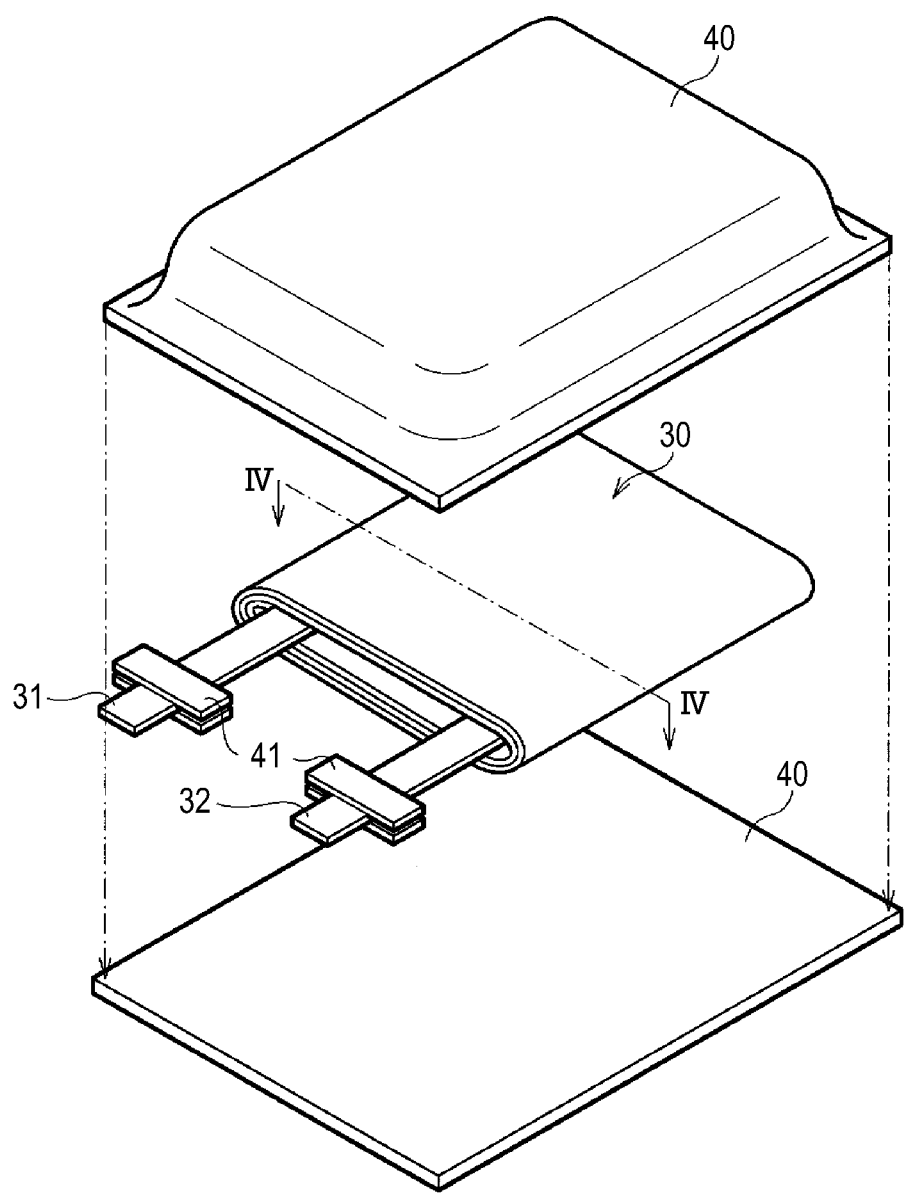
FIG. 3 is a perspective view showing a configuration of another secondary battery (laminated film type) of an embodiment of the present application.
Figure 4:
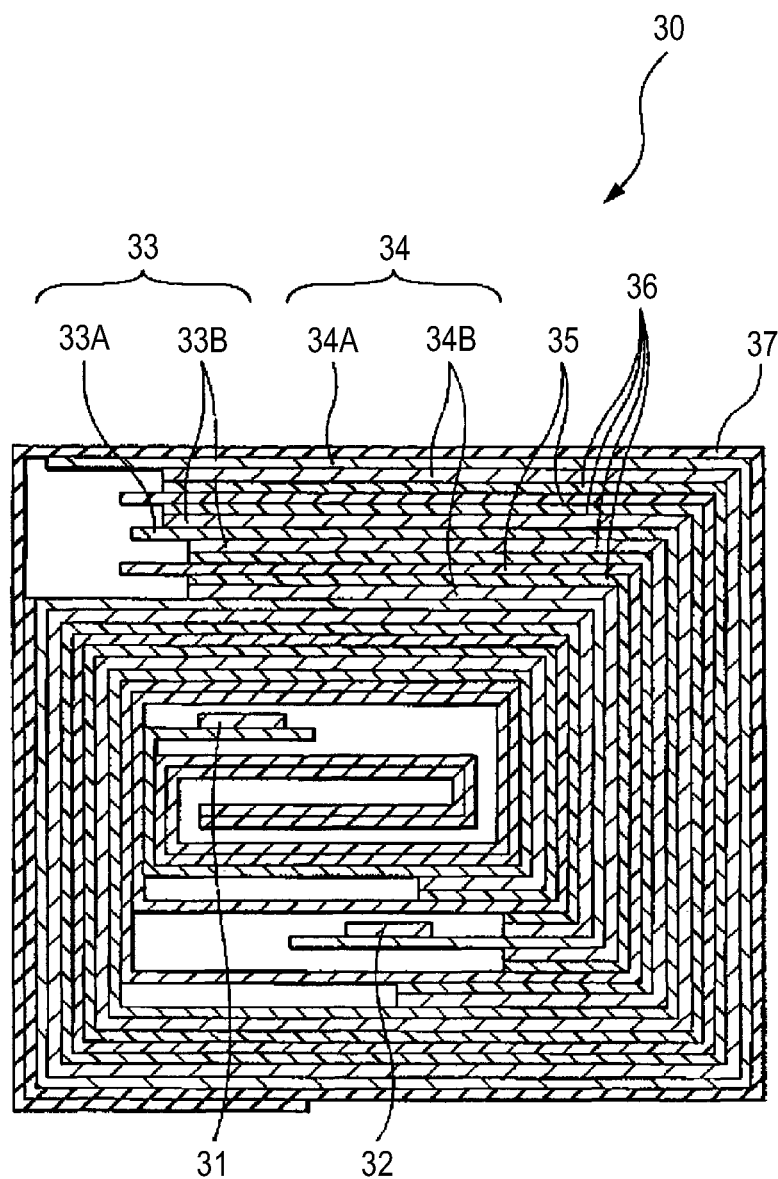
FIG. 4 is a sectional view along a IV-IV line of a wound electrode body shown in FIG. 3.

FIG. 3 shows an exploded perspective configuration of another secondary battery in an embodiment of the present application; and FIG. 4 shows enlargedly a section along a IV-IV line of a wound electrode body 30 shown in FIG. 3. The constituent elements of the secondary battery of a cylindrical type as already described are hereunder autoed as needed.

[Entire Configuration of Secondary Battery]

The secondary battery as described herein is a lithium ion secondary battery of a so-called laminated film type. In this secondary battery, the wound electrode body 30 is housed in the inside of a package member 40 in a film form. In this wound electrode body 30, a positive electrode 33 and a negative electrode 34 are laminated via a separator 35 and an electrolyte layer 36 and wound. A positive electrode lead 31 is installed in the positive electrode 33, and a negative electrode lead 32 is also installed in the negative electrode 34. An outermost peripheral part of this wound electrode body 30 is protected by a protective tape 37.

The positive electrode lead 31 and the negative electrode lead 32 are each led out in, for example, the same direction from the inside toward the outside of the package member 40. The positive electrode lead 31 is, for example, formed of an electrically conductive material such as Al, and the negative electrode lead 32 is, for example, formed of an electrically conductive material such as Cu, Ni, and stainless steel. Such an electrically conductive material is, for example, formed in a thin plate state or a network state.

The package member 40 is, for example, a laminated film obtained by laminating a fusible layer, a metal layer, and a surface protective layer in this order. In this laminated film, for example, the respective outer edges of fusible layers of two sheets of the laminate film are stuck to each other by means of fusion or with an adhesive in such a manner that the fusible layer is opposing to the would electrode body 30. The fusible layer is, for example, a film made of polyethylene, polypropylene, etc. The metal layer is, for example, an Al foil, etc. The surface protective layer is, for example, a film made of nylon, polyethylene terephthalate, etc.

Above all, the package member 40 is preferably an aluminum laminated film obtained by laminating a polyethylene film, an aluminum foil, and a nylon film in this order. However, the package member 40 may be a laminated film having other laminate structure, or may be a polymer film made of polypropylene, etc. or a metal film.

A contact film 41 is inserted between the package member 40 and each of the positive electrode lead 31 and the negative electrode lead 32 for the purpose of preventing invasion of the outside air from occurring. This contact film 41 is formed of a material having adhesion to each of the positive electrode lead 31 and the negative electrode lead 32. Examples of such a material include polyolefin resins such as polyethylene, polypropylene, modified polyethylene, and modified polypropylene.

The positive electrode 33 is, for example, a positive electrode in which a positive electrode active material layer 33B is provided on the both surfaces of a positive electrode collector 33A. The negative electrode 34 is, for example, a negative electrode in which a negative electrode active material layer 34B is provided on the both surfaces of a negative electrode collector 34A. The configurations of the positive electrode collector 33A, the positive electrode active material layer 33B, the negative electrode collector 34A, and the negative electrode active material layer 34B are the same as those of the positive electrode collector 21A, the positive electrode active material layer 21B, the negative electrode collector 22A, and the negative electrode active material layer 22B, respectively. In addition, the configuration of the separator 35 is the same as the configuration of the separator 23.

The electrolyte layer 36 is one in which the electrolytic solution is held by a polymer compound and may contain other materials such as additives, as the need arises. The electrolyte layer 36 is an electrolyte in a so-called gel form. This is because not only a high ionic conductivity (for example, 1 mS/cm or more at room temperature) is obtainable, but the liquid leakage of the electrolytic solution is prevented from occurring.

The polymer compound is, for example, any one kind or two or more kinds of polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethyl methacrylate, polyacrylic acid, polymethacrylic acid, a styrene-butadiene rubber, a nitrile-butadiene rubber, polystyrene, polycarbonate, and a copolymer of vinylidene fluoride and hexafluoropropylene. Above all, polyvinylidene fluoride and a copolymer of vinylidene fluoride and hexafluoropropylene are preferable, and polyvinylidene fluoride is more preferable. This is because these materials are electrochemically stable.

A composition of the electrolytic solution is the same as that in the case of a cylindrical type. However, in the electrolyte layer 36 that is an electrolyte in a gel form, the solvent of the electrolytic solution as referred to herein has a broad concept including not only a liquid solvent but a material having ionic conductivity such that it is able to dissociate the electrolyte salt. Accordingly, in the case of using a polymer compound having ionic conductivity, this polymer compound is also included in the solvent.

Incidentally, in place of the electrolyte layer 36 in a gel form, the electrolytic solution may be used as it is. In that case, the separator 35 is impregnated with the electrolytic solution.

In this secondary battery, similar to the case of a cylindrical type, at least one of the positive electrode 33, the negative electrode 34, and the electrolytic solution contains the alkyl carbonate represented by the formula (1).

[Motion of Secondary Battery]

In this secondary battery, for example, at the time of charge, a lithium ion deintercalated from the positive electrode 33 is intercalated in the negative electrode 34 via the electrolyte layer 36, and at the time of discharge, a lithium ion deintercalated from the negative electrode 34 is intercalated in the positive electrode 33 via the electrolyte layer 36.

[Manufacturing Method of Secondary Battery]

The secondary battery equipped with this electrolyte layer 36 in a gel form is, for example, manufactured according to the following three kinds of procedures.

In a first procedure, the positive electrode 33 and the negative electrode 34 are fabricated in the same fabrication procedure as that in the positive electrode 21 and the negative electrode 22, respectively. In that case, the positive electrode active material layer 33B is formed on the both surfaces of the positive electrode collector 33A to fabricate the positive electrode 33, and the negative electrode active material layer 34B is also formed on the both surfaces of the negative electrode collector 34A to fabricate the negative electrode 34. Subsequently, a precursor solution containing an electrolytic solution, a polymer compound, and a solvent such as an organic solvent is prepared, and the precursor solution is then applied on each of the positive electrode 33 and the negative electrode 34 to form the electrolyte layer 36 in a gel form. Subsequently, the positive electrode lead 31 is installed in the positive electrode collector 33A, and the negative electrode lead 32 is also installed in the negative electrode collector 34A, by adopting a welding method or the like. Subsequently, the positive electrode 33 and the negative electrode 34, on each of which is formed the electrolyte layer 36, are laminated via the separator 35 and wound to fabricate the wound electrode body 30, and the protective tape 37 is stuck onto an outermost peripheral part thereof. Subsequently, the wound electrode body 30 is interposed between the two package members 40 in a film form, and the outer edges of the package members 40 are allowed to adhere to each other by adopting a heat fusion method or the like, thereby sealing the wound electrode body 30 therein. In that case, the contact film 41 is inserted between each of the positive electrode lead 31 and the negative electrode lead 32 and the package member 40.

In a second procedure, the positive electrode lead 31 is installed in the positive electrode 33, and the negative electrode lead 32 is also installed in the negative electrode 34. Subsequently, the positive electrode 33 and the negative electrode 34 are laminated via the separator 35 and wound, thereby fabricating a wound body that is a precursor of the wound electrode body 30, and the protective tape 37 is then stuck to an outermost peripheral part thereof. Subsequently, the wound body is interposed between the two package members 40 in a film form, and the outer edges exclusive of one side are allowed to adhere to each other by adopting a heat fusion method or the like, thereby housing the wound body in the inside of the package member 40 in a bag form. Subsequently, an electrolyte composition containing an electrolytic solution, a monomer that is a raw material of a polymer compound, and a polymerization initiator, and optionally, other materials such as a polymerization inhibitor is prepared and injected into the inside of the package member 40 in a bag form. Thereafter, the package member 40 is hermetically sealed by adopting a heat fusion method or the like. Subsequently, the monomer is heat polymerized. There is thus formed a polymer compound, whereby the electrolyte layer 36 in a gel form is formed.

In a third procedure, a wound body is fabricated and housed in the inside of the package member 40 in a bag form in the same manner as that in the foregoing second procedure, except for using the separator 35 having a polymer compound applied on the both surfaces thereof. Examples of the polymer compound to be coated on this separator 35 include polymers composed of, as a component, vinylidene fluoride (for example, a homopolymer, a copolymer, a multi-component copolymer, etc.). Specific examples thereof include polyvinylidene fluoride; a binary copolymer composed of, as components, vinylidene fluoride and hexafluoropropylene; and a ternary copolymer composed of, as components, vinylidene fluoride, hexafluoropropylene, and chlorotrifluoroethylene. Incidentally, one kind or two or more kinds of other polymer compounds may be used together with the polymer composed of, as a component, vinylidene fluoride. Subsequently, an electrolytic solution is prepared and injected into the inside of the package member 40, and an opening of the package member 40 is then hermetically sealed by a heat fusion method or the like. Subsequently, the separator 35 is brought into intimate contact with each of the positive electrode 33 and the negative electrode 34 via the polymer compound upon heating while adding a weight to the package member 40. According to this, since the electrolytic solution is impregnated into the polymer compound, the polymer compound is gelled, whereby the electrolyte layer 36 is formed.

In this third procedure, swelling of the secondary battery is suppressed as compared with the first procedure. Also, in comparison with the second procedure, in the third procedure, the monomer that is a raw material of the polymer compound, or the solvent, or the like does not substantially remain in the electrolyte layer 36, and therefore, the forming step of a polymer compound is controlled well. For that reason, sufficient adhesion between each of the positive electrode 33, the negative electrode 34 and the separator 35 and the electrolyte layer 36 is obtainable.

[Actions and Effects of Secondary Battery]

According to this secondary battery of a laminated film type, since the electrolytic solution of the electrolyte layer 36 contains the alkyl carbonate represented by the formula (1), excellent battery characteristics can be obtained for the same reasons as those in the secondary battery of a cylindrical type. Other actions and effects are the same as those in the cylindrical type.

<2. Use of Secondary Battery>

Next, application examples of the secondary battery are described.

The use of the secondary battery is not particularly limited so far as it is concerned with machines, appliances, instruments, apparatuses, systems (assemblies of plural appliances, etc.), etc., for which the secondary battery can be used as an electric power source for driving, an electric power storage source for electric power accumulation, or the like. In the case where the secondary battery is used as an electric power source, it may be used as a main electric power source (electric power source to be preferentially used), or may be used as an auxiliary electric power source (electric power source to be used in place of the main electric power source or upon being switched from the main electric power source). The kind of this main electric power source is not limited to a secondary battery.

Examples of the use of the secondary battery include the following uses. That is, examples thereof include portable electronic appliances such as a video camera, a digital still camera, a mobile phone, a laptop computer, a cordless phone, a headphone stereo cassette tape recorder, a portable radio, a portable television set, and a personal digital assistant. Also, the electronic appliance includes portable life electric instruments such as an electric shaver. Also, examples thereof include storage devices such as a backup electric power source and a memory card. Also, examples thereof include power tools such as a power drill and a power saw. Also, examples thereof include battery packs to be used as an electric power source for a laptop computer, etc. Also, examples thereof include medical electronic appliances such as a pacemaker and a hearing aid. Also, examples thereof include electric vehicles such as an electric car (inclusive of a hybrid car). Also, examples thereof include electric power storage systems such as a household battery system for storing an electric power against an emergency, etc. As a matter of course, other uses than those described above may be applied.

Above of all, the secondary battery is effectively applied to a battery pack, an electric vehicle, an electric power storage system, a power tool, an electronic appliance, and so on. This is because the secondary battery for those applications is required to have excellent battery characteristics, and therefore, by using the secondary battery of the embodiment of the present application, it is possible to contrive to effectively enhance the characteristics. Incidentally, the battery pack is an electric power source using a secondary battery and is a so-called assembled battery and the like. The electric vehicle is a vehicle to work (run) while using a secondary battery as an electric power source for driving, and as described above, it may be a car which is also equipped with a driving source other than the secondary battery (for example, a hybrid car, etc.). The electric power storage system is a system using a secondary battery as an electric power storage source. For example, in a household electric power storage system, an electric power is stored in a secondary battery that is an electric power storage source, and in view of the fact that the electric power is consumed depending on the situation, household electric products and the like can be used. The power tool is a tool to move a movable part (for example, a drill, etc.) while using a secondary battery as an electric power source for driving. The electronic appliance is an appliance to exhibit various functions while using a secondary battery as an electric power source for drying.

Here, some application examples of the secondary battery are specifically described. Incidentally, the configuration of each of the application examples described below is an example to the bitter end, and therefore, it may be properly changed.

<2-1. Battery Pack>

Figure 5:
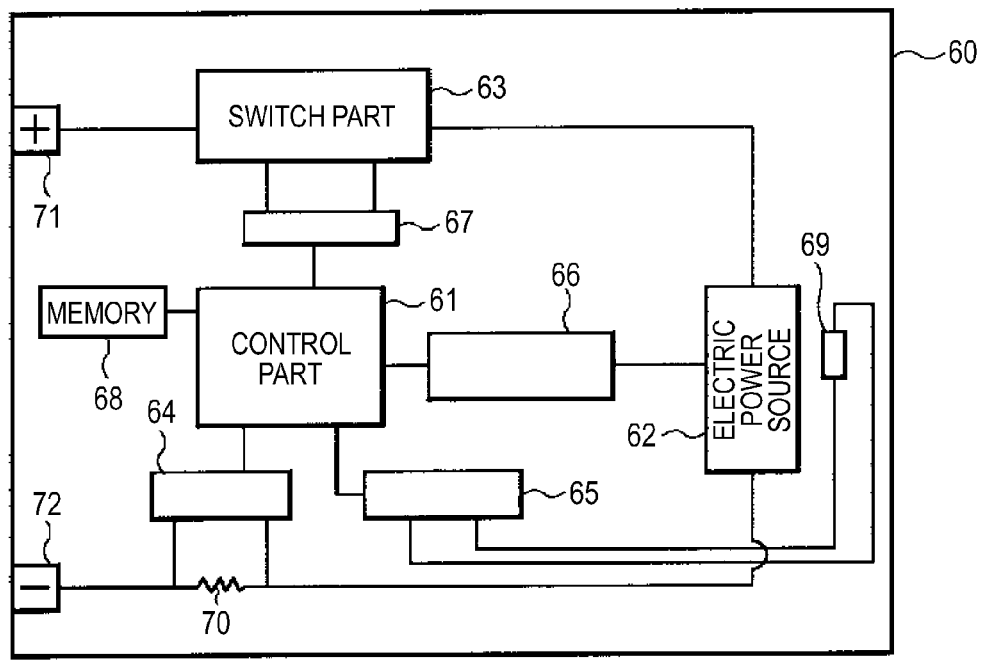
FIG. 5 is a block diagram showing a configuration of an application example (battery pack) of a secondary battery.

FIG. 5 shows a block configuration of a battery pack. As shown in FIG. 5, in this battery pack, for example, a control part 61, an electric power source 62, a switch part 63, a current measurement part 64, a temperature detection part 65, a voltage detection part 66, a switch control part 67, a memory 68, a temperature detection element 69, a current detection resistor 70, a positive electrode terminal 71, and a negative electrode terminal 72 are provided in the inside of a case 60 formed of a plastic material or the like.

The control part 61 controls the motion of the whole of the battery pack (inclusive of the use state of the electric power source 62) and includes, for example, a central processing unit (CPU) and the like. The electric power source 62 includes one or two or more secondary batteries (not shown). This electric power source 62 is, for example, an assembled battery including two or more secondary batteries, and a connection mode may be either a series or parallel mode, or a mixed mode of the both. As an example, the electric power source 62 includes six secondary batteries connected in two rows and three columns.

The switch part 63 switches the use state of the electric power source 62 (pros and cons on the connection of the electric power source 62 to an external appliance) depending upon an instruction of the control part 61. This switch part 63 includes, for example, a charge control switch, a discharge control switch, a diode for charge, and a diode for discharge (all of which are not shown), etc. Each of the charge control switch and the discharge control switch is, for example, a semiconductor switch such as a field-effect transistor using a metal oxide semiconductor (MOSFET).

The current measurement part 64 measures a current using the current detection resistor 70 and outputs the measurement result into the control part 61. The temperature detection part 65 measures a temperature using the temperature detection element 69 and outputs the measurement result into the control part 61. This temperature measurement result is, for example, used in the case where the control part 61 controls the charge and discharge at the time of abnormal heat generation, or for the purpose of conducting a correction processing by the control part 61 at the time of calculating a remaining capacity. The voltage detection part 66 measures a voltage of the secondary battery in the electric power source 62 and feeds the measured voltage into the control part 61 upon being subjected to analog/digital (A/D) conversion.

The switch control part 67 controls the motion of the switch part 63 depending upon signals inputted from the current measurement part 64 and the voltage detection part 66.

For example, in the case where the battery voltage reaches an overcharge detection voltage, this switch control part 67 cuts the switch part 63 (charge control switch), thereby achieving the control such that a charge current does not flow into a current path of the electric power source 62. According to this, in the electric power source 62, only the discharge via the diode for discharge becomes possible. Incidentally, for example, in the case where a large current flows at the time of charge, the switch control part 67 blocks the charge current.

In addition, for example, in the case where the battery voltage reaches an overdischarge detection voltage, the switch control part 67 cuts the switch part 63 (discharge control switch), thereby achieving the control such that a discharge current does not flow into a current path of the electric power source 62. According to this, in the electric power source 62, only the charge via the diode for charge becomes possible. Incidentally, for example, in the case where a large current flows at the time of discharge, the switch control part 67 blocks the discharge current.

Incidentally, in the secondary battery, for example, the overcharge detection voltage is 4.20 V±0.05 V, and the overdischarge detection voltage is 2.4 V±0.1 V.

The memory 68 is, for example, EEPROM that is a nonvolatile memory. In this memory 68, for example, numerical values operated by the control part 61 and information of the secondary battery measured at a manufacturing process stage (for example, an internal resistance in an initial state, etc.) are stored. Incidentally, when a full charge capacity of the secondary battery is stored in the memory 68, the control part 61 is able to grasp a remaining capacity or the other information.

The temperature detection element 69 measures a temperature of the electric power source 62 and outputs the measurement result into the control part 61, and it is, for example, a thermistor.

Each of the positive electrode terminal 71 and the negative electrode terminal 72 is a terminal which is connected to an external appliance (for example, a laptop personal computer, etc.) to be operated using the battery pack or an external appliance (for example, a charger, etc.) to be used for charging the battery pack. The charge and discharge of the electric power source 62 are conducted via the positive electrode terminal 71 and the negative electrode terminal 72.

<2-2. Electric Vehicle>

Figure 6:
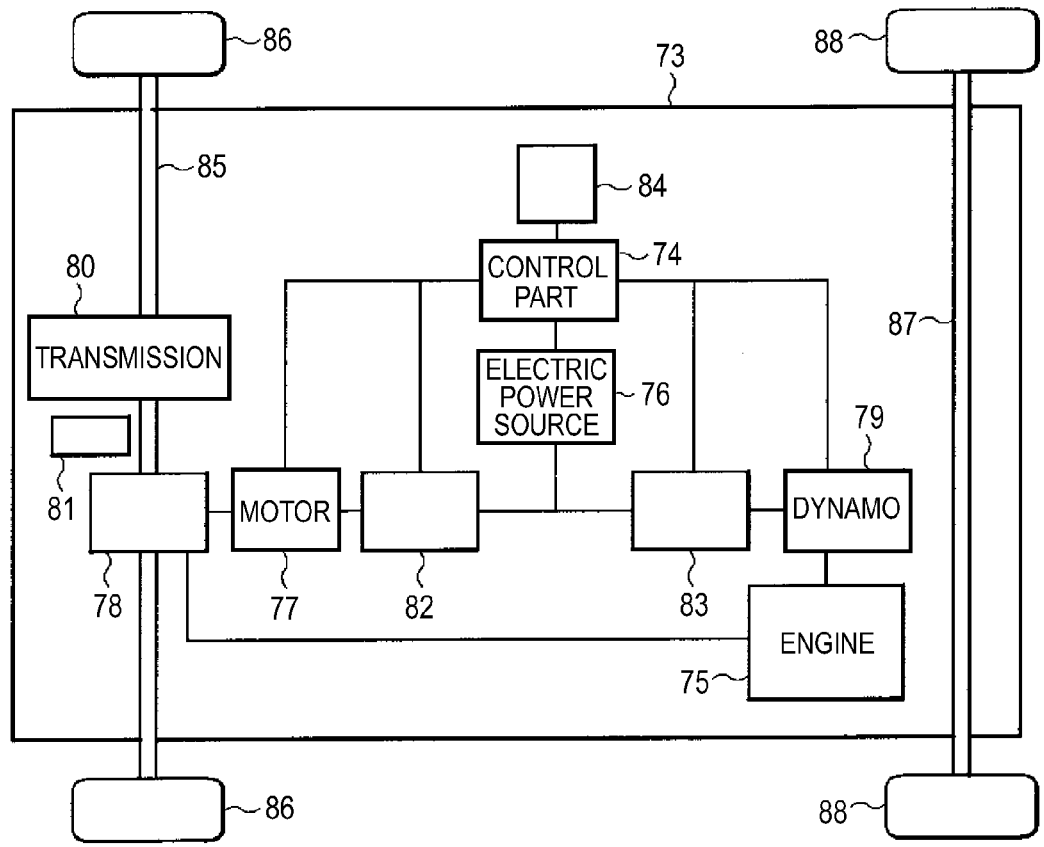
FIG. 6 is a block diagram showing a configuration of an application example (electric vehicle) of a secondary battery.

FIG. 6 shows a block configuration of a hybrid car as an example of the electric vehicle. As shown in FIG. 6, in this electric vehicle, for example, a control part 74, an engine 75, an electric power source 76, a motor 77 for driving, a differential device 78, a dynamo 79, a transmission 80 and a clutch 81, inverters 82 and 83, and various sensors 84 are provided in the inside of a metal-made case 73. Besides, the electric vehicle is, for example, provided with a drive shaft 85 for front wheels and front wheels 86 connected to the differential device 78 and the transmission 80, a drive shaft 87 for rear wheels, and rear wheels 88.

This electric vehicle is able to run while using either the engine 75 or the motor 77 as a drive source. The engine 75 is a chief power source, for example, a gasoline engine, etc. In the case where the engine 75 is used as the drive source, a driving force (torque) of the engine 75 is, for example, transmitted into the front wheels 86 or the rear wheels 88 via, as drive parts, the differential device 78, the transmission 80, and the clutch 81. Incidentally, the torque of the engine 75 is also transmitted into the dynamo 79, the dynamo 79 generates an alternate current electric power due to the torque, and the alternate current electric power is converted into a direct current electric power via the inverter 83 and accumulated in the electric power source 76. On the other hand, in the case where the motor 77 that is a conversion part is used as a drive source, an electric power (direct current electric power) to be fed from the electric power source 76 is converted into an alternate current electric power via the inverter 82, and the motor 77 is driven by the alternate current electric power. This driving force (torque) converted from the electric power by the motor 77 is, for example, transmitted into the front wheels 86 or the rear wheels 88 via, as drive parts, the differential device 78, the transmission 80, and the clutch 81.

Incidentally, there may also be adopted a manner such that when the electric vehicle reduces the speed by a non-illustrated brake mechanism, a power of resistance at the time of speed reduction is transmitted as the torque into the motor 77, and the motor 77 generates an alternate current electric power by the torque. It is preferable that this alternate current electric power is converted into a direct current electric power via the inverter 82, and the subject direct current regenerative electric power is accumulated in the electric power source 76.

The control part 74 controls the motion of the whole of the electric vehicle and includes, for example, CPU, etc. The electric power source 76 includes one or two or more secondary batteries (not shown). There may also be adopted a manner such that this electric power source 76 is connected to an external electric power source and receives an electric power feed from the external electric power source, thereby making it possible to accumulate the electric power. The various sensors 84 are used for controlling the torque of the engine 75, or controlling an opening of a non-illustrated throttle valve (throttle opening). The various sensors 84 include, for example, a speed sensor, an acceleration sensor, an engine speed sensor, etc.

Incidentally, while the hybrid car has been described above as the electric vehicle, the electric vehicle may also be a vehicle (electric car) which runs using only the electric power source 76 and the motor 77 without using the engine 75.

<2-3. Electric Power Storage System>

Figure 7:
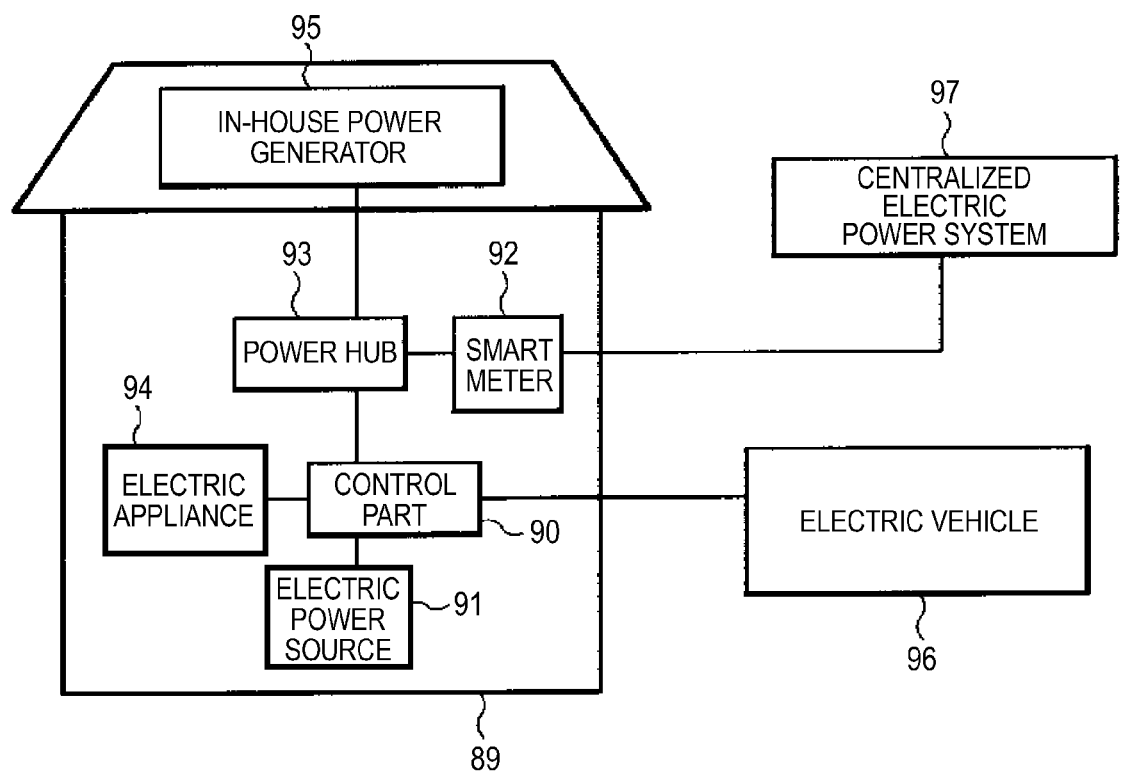
FIG. 7 is a block diagram showing a configuration of an application example (electric power storage system) of a secondary battery.

FIG. 7 shows a block configuration of an electric power storage system. As shown in FIG. 7, for example, this electric power storage system is provided with a control part 90, an electric power source 91, a smart meter 92, and a power hub 93 in the inside of a building 89 such as a general house and a building for commercial use.

Here, the electric power source 91 is, for example, connected to an electric appliance 94 set up in the inside of the building 89 and may also be connected to an electric vehicle 96 stopped in the outside of the building 89. In addition, the electric power source 91 is connected to an in-house power generator 95 set up in the building 89 via the power hub 93 and may also be connected to an external centralized electric power system 97 via the smart meter 92 and the power hub 93.

Incidentally, the electric appliance 94 includes, for example, one or two or more household electrical appliances such as a refrigerator, an air conditioner, a television receiver, and a water heater. The in-house power generator 95 is, for example, one or two or more members such as a solar generator and a wind power generator. The electric vehicle 96 is, for example, one or two or more members such as an electric car, an electric motorcycle, and a hybrid car. The centralized electric power system 97 is, for example, one or two or more members such as a thermal power plant, a nuclear power plant, a hydroelectric power plant, and a wind power plant.

The control part 90 controls the motion of the whole of the electric power storage system (inclusive of the use state of the electric power source 91) and includes, for example, CPU and the like. The electric power source 91 includes one or two or more secondary batteries (not shown). The smart meter 92 is, for example, a network compatible wattmeter to be set up in the building 89 on the electric power demand side and is capable of communicating with the electric power feed side. Following this, for example, the smart meter 92 controls a balance between demand and feed in the building 89 while communicating with the outside according to the need and is capable of making it possible to feed energy efficiently and stably.

According to this electric power storage system, for example, not only an electric power is accumulated in the electric power source 91 via the smart meter 92 and the power hub 93 from the centralized electric power system 97 that is an external power source, but an electric power is accumulated in the electric power source 91 via the power hub 93 from the solar generator 95 that is an independent electric power source. The electric power accumulated in this electric power source 91 is fed into the electric appliance 94 or the electric vehicle 96 depending upon an instruction of the control part 91 according to the need. Therefore, not only the electric appliance 94 becomes operable, but the electric vehicle 96 becomes chargeable. That is, the electric power storage system is a system which makes it possible to accumulate and feed an electric power within the building 89 by using the electric power source 91.

The electric power accumulated in the electric power source 91 can be arbitrarily utilized. For that reason, for example, the electric power is accumulated in the electric power source 91 from the centralized electric power system 97 in the midnight where the electricity charge is inexpensive, and the electric power accumulated in the electric power source 91 can be used in the daytime where the electricity charge is expensive.

Incidentally, the foregoing electric power storage system may be set up for every house (every household), or may be set up for every plural houses (every plural households).

<2-4. Power Tool>

Figure 8:
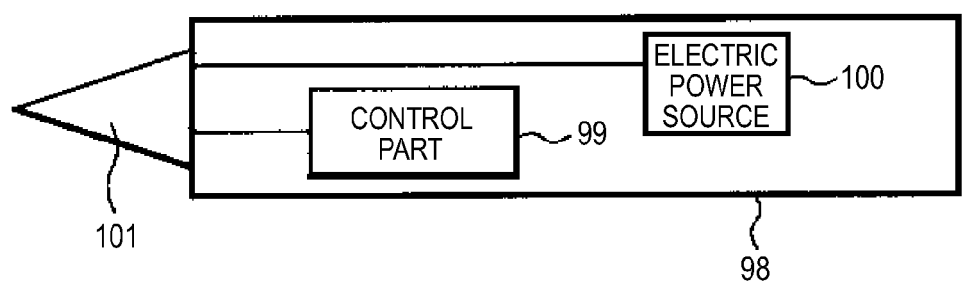
FIG. 8 is a block diagram showing a configuration of an application example (power tool) of a secondary battery.

FIG. 8 shows a block configuration of a power tool. As shown in FIG. 8, this power tool is, for example, a power drill and is provided with a control part 99 and an electric power source 100 in the inside of a tool main body 98 formed of a plastic material or the like. In this tool main body 98, for example, a drill part 101 that is a movable part is installed in an operable (rotatable) manner.

The control part 99 controls the motion of the whole of the power tool (inclusive of the use state of the electric power source 100) and includes, for example, CPU and the like. This electric power source 100 includes one or two or more secondary batteries (not shown). This control part 99 feeds an electric power into the drill part 101 from the electric power source 100 depending upon the operation of a non-illustrated operating switch according to the need, thereby making it movable.

EXAMPLES

Specific working examples of the present application are hereunder described in detail.

Experimental Examples 1-1 to 1-18

A lithium ion secondary battery of a laminated film type shown in FIGS. 3 and 4 was fabricated according to the following procedures.

In the case of fabricating a positive electrode 33, 94 parts by mass of a positive electrode active material ($LiCoO_2$), 3 parts by mass of a positive electrode binder (polyvinylidene fluoride: PVDF), and 3 parts by mass of a positive electrode electrically conductive agent (graphite) were mixed to prepare a positive electrode mixture. Subsequently, the positive electrode mixture was dispersed in an organic solvent (N-methyl-2-pyrrolidone: NMP) to prepare a positive electrode mixture slurry. Subsequently, the positive electrode mixture slurry was applied on the both surfaces of a positive electrode collector 33A (aluminum foil having a thickness of 10 μm) and then dried to form a positive electrode active material layer 33B. The positive electrode active material layer 33B was then compression molded (thickness on one surface side=30 μm, volume density=3.4 g/cm$^3$). Thereafter, the positive electrode collector 33A having the positive electrode active material layer 33B formed thereon was cut into a strip form (50 mm in width×300 mm in length).

In the case of fabricating a negative electrode 34, 97 parts by mass of a negative electrode active material (meso-carbon microbead that is a carbon material) and 3 parts by mass of a negative electrode binder (PVDF) were mixed to prepare a negative electrode mixture. Subsequently, the negative electrode mixture was dispersed in an organic solvent (NMP) to prepare a negative electrode mixture slurry. Subsequently, the negative electrode mixture slurry was applied on the both surfaces of a negative electrode collector 34A (copper foil having a thickness of 10 μm) and then dried to form a negative electrode active material layer 34B. The negative electrode active material layer 34B was then compression molded (thickness on one surface side=30 μm, volume density=1.8 g/cm$^3$). Thereafter, the negative electrode collector 34A having the negative electrode active material layer 34B formed thereon was cut into a strip form (50 mm in width×300 mm in length).

In the case of preparing an electrolytic solution, an electrolyte salt ($LiPF_6$) was dissolved in a solvent (ethylene carbonate (EC) and diethyl carbonate (DEC)), to which was then added an alkyl carbonate or the like, according to the need. In that case, a mixing ratio (weight ratio) in the solvent was set to 30/70 in terms of EC/DEC, and a content of the electrolyte salt was set to 0.9 moles/kg relative to the solvent.

The kind and content of the alkyl carbonate or the like are shown in Table 1. A linear or branched lithium alkyl carbonate having a carbon number of from 5 to 22 was used as the alkyl carbonate. Besides, for the comparison, a dialkyl carbonate (ditetradecyl carbonate), a PEG-PPG block copolymer (PLURONIC-F127, manufactured by BASF), an alkyl sulfonate (lithium perfluorooctanesulfonate), a carboxylate ester (methyl caprylate), or a lithium carboxylate(lithium caprylate) was used.

In the case of assembling a secondary battery, an Al-made positive electrode lead 31 was welded in one end of the positive electrode collector 33A, and an Ni-made negative electrode lead 32 was also welded in one end of the negative electrode collector 34A. Subsequently, the positive electrode 33, a separator 35, the negative electrode 34, and a separator 35 were laminated in this order. This separator 35 is one in which a polymer compound layer (PVDF having a thickness of 2 μm) is formed on the both surfaces of a substrate layer (microporous polyethylene film having a thickness of 7 μm that is a porous film). Subsequently, the laminate was wound in a longitudinal direction to form a wound body that is a precursor of a wound electrode body 30, and a winding end portion thereof was fixed by a protective tape 37 (pressure-sensitive adhesive tape). Subsequently, the wound body was interposed between package members 40, and the outer edges exclusive of one side were heat fused, thereby housing the wound body in the inside of the package member 40 in a bag form. This package member 40 is an aluminum laminated film in which a nylon film having a thickness of 30 μm, an aluminum foil having a thickness of 40 μm, and a cast polypropylene film having a thickness of 30 μm were laminated from the outside. Subsequently, 2 g of the electrolytic solution was injected from an opening of the package member 40 and the separator 35 is impregnated with the electrolytic solution, thereby fabricating the wound electrode body 30. Finally, the opening of the package member 40 was sealed in a vacuum atmosphere by adopting a heat fusion method. There was thus completed a secondary battery.

Incidentally, in the case of not using an alkyl carbonate, the secondary battery after assembling was allowed to stand for 12 hours according to the need, thereby promoting the impregnation of the electrolytic solution relative to each of the positive electrode 33 and the negative electrode 34.

As battery characteristics of the secondary battery, an initial battery capacity characteristic, a cycle characteristic, and a resistance characteristic were examined, and results shown in Table 1 were obtained. Incidentally, for confirmation, Table 1 also shows a structure (linear or branched) of an alkyl group in the alky carbonate and also a carbon number of each of a main chain and a side chain thereof In the case of examining the initial battery capacity characteristic, the secondary battery was subjected to one cycle of charge and discharge with a current of 800 mA in an ordinary-temperature environment (23° C.), thereby measuring a discharge capacity (initial capacity: mAh).

In the case of examining the cycle characteristic, after the secondary battery was subjected to one cycle of charge and discharge in an ordinary-temperature environment (23° C.) and measured for a discharge capacity (mAh), the charge and discharge were repeated in the same environment until a total sum of the cycle numbers reached 300 cycles, thereby measuring a discharge capacity (mAh). From this result, a capacity retention rate (%) was calculated according to the following expression.

Capacity retention rate [%]={(Discharge capacity at the 300th cycle)/(Discharge capacity at the first cycle)}×100

At the time of charge and discharge, the secondary battery was subjected to constant-current constant-voltage charge with a current of 1 C until the voltage reached an upper limit voltage of 4.2 V; and thereafter, the secondary battery was subjected to constant-current discharge with a current of 1 C until the voltage reached a cut-off voltage of 3.0 V. The term "1 C" as referred to herein is a current value at which the battery capacity (theoretical capacity) is completely discharged for one hour.

In the case of examining the resistance characteristic, in the process of examining the cycle characteristic, a resistance of the secondary battery (1 kHz alternate current impedance: mΩ) was measured at the time of charge at the first cycle (charge voltage=4.2 V); and thereafter, the resistance was again measured at the time of charge at the 300th cycle under the same conditions. From this result, a resistance change (mΩ) was calculated according to the following expression.

Resistance change (mΩ)=(Resistance at the 300th cycle)−(Resistance at the first cycle)

TABLE 1

| | Electrolytic solution | | | | | | | |
|---|---|---|---|---|---|---|---|---|
| | | | Carbon number | | | Initial | Capacity | Resistance |
| Experimental Example | Alkyl carbonate, etc. | Structure | Main chain | Side chain | Content (% by weight) | capacity (mAh) | retention rate (%) | change (mΩ) |
| I-1 | Lithium octyl carbonate | Linear | 8 | — | 0.5 | 808 | 85 | 20 |
| I-2 | Lithium 2-butyl-octyl carbonate | Branched | 8 | 4 | | 811 | 84 | 21 |
| I-3 | Lithium dodecyl carbonate | Linear | 12 | — | | 809 | 85 | 20 |
| I-4 | Lithium 2-octyl-dodecyl carbonate | Branched | 12 | 8 | | 810 | 83 | 20 |
| I-5 | Lithium 2-decyl-tetradecyl carbonate | Branched | 14 | 10 | | 806 | 81 | 24 |
| I-6 | Lithium octadecyl carbonate | Linear | 18 | — | | 808 | 84 | 19 |
| I-7 | Lithium eicosyl carbonate | Linear | 20 | — | | 806 | 84 | 20 |
| I-8 | — | — | — | — | — | 791 | 80 | 34 |
| I-9 | — (Allowed to stand for 12 hours) | — | — | — | — | 802 | 81 | 33 |
| I-10 | Lithium pentyl carbonate | Linear | 5 | — | 0.5 | 805 | 82 | 30 |
| I-11 | Lithium 2,4,4-trimethyl-pentyl carbonate | Branched | 5 | 1 × 3 | | 805 | 83 | 31 |
| I-12 | Lithium hexyl carbonate | Linear | 6 | — | | 804 | 83 | 29 |
| I-13 | Lithium docosyl carbonate | Linear | 22 | — | | 804 | 82 | 23 |
| I-14 | Ditetradecyl carbonate | — | — | — | | 805 | 82 | 29 |
| I-15 | PEG-PPG block copolymer | — | — | — | | 805 | 76 | 35 |

TABLE 1-continued

| | | Electrolytic solution | | | | | | |
|---|---|---|---|---|---|---|---|---|
| | | | | Carbon number | | | Initial | Capacity | Resistance |
| Experimental Example | Alkyl carbonate, etc. | Structure | Main chain | Side chain | Content (% by weight) | capacity (mAh) | retention rate (%) | change (mΩ) |
| I-16 | Lithium perfluorooctanesulfonate | — | — | — | | 805 | 80 | 32 |
| I-17 | Methyl caprylate | — | — | — | | 803 | 77 | 36 |
| I-18 | Lithium caprylate | — | — | — | | 805 | 81 | 33 |

In the case of using an alkyl carbonate in which the carbon number of the linear alkyl group, or the carbon number of the main chain in the branched alkyl group is from 8 to 20 (Experimental Examples 1-1 to 1-7), favorable results were obtained. That is, as compared with the case of not using an alkyl carbonate (Experimental Examples 1-8 and 1-9) or the case of using an alkyl carbonate having a carbon number falling outside the foregoing range (Experimental Examples 1-10 to 1-13), not only the initial capacity and the capacity retention rate increased, but in particular, the resistance change significantly decreased. This result reveals that when the carbon number of the alkyl group in the alkyl carbonate falls within the appropriate range, since the function as a surfactant is effectively exhibited, a peculiar advantage that both the initial capacity and the capacity retention rate increase, whereas only the resistance change decreases is obtained.

Incidentally, in the case of allowing an electrolytic solution not containing an alkyl carbonate, etc. to stand for 12 hours (Experimental Example 1-9), since the impregnation of the electrolytic solution into each of the positive electrode 33 and the negative electrode 34 proceeded, not only the initial capacity and the capacity retention rate slightly increased, but the resistance change slightly decreased. However, even when the electrolytic solution was then further allowed to stand, a more improvement was not observed, and the initial capacity, the capacity retention rate, and the resistance change were far inferior to those in the case of using an alkyl carbonate having a carbon number of the alkyl group falling within the appropriate range (Experimental Examples 1-1 to 1-7).

In particular, in the case of using an alkyl carbonate having a carbon number of the alkyl group falling within the appropriate range, when the alkyl group was branched (Experimental Examples 1-2 and 1-4), the initial capacity increased as compared with the case where the alkyl group was linear (Experimental Examples 1-1 and 1-3). This result reveals that when the alkyl group has a hydrophobic side chain, since the alkyl carbonate is easy to coordinate to each of the hydrophobic positive electrode active material layer 33 and negative electrode active material layer 34, the penetration properties of the electrolytic solution are more enhanced.

In addition, in the case where the alkyl group is branched, when a total carbon number of the alkyl group is not more than 20 (Experimental Example 1-4), not only the initial capacity and the capacity retention rate increased, but the resistance change decreased as compared with the case where the total carbon number of the alkyl group is more than 20 (Experimental Example 1-5).

Here, in the case of using a dialkyl carbonate, an alkylsulfonic acid, a carboxylate ester, or a lithium carboxylate in place of the alkyl carbonate (Experimental Examples 1-14 to 1-18), there was merely observed such a degree that the initial capacity or the capacity retention rate slightly increased, and the resistance change slightly decreased depending upon the kind thereof. This result reveals that different from the alkyl carbonate having a carbon number of the alkyl group falling within the appropriate range, the dialkyl carbonate or the like hardly exhibits the effective and specific functions as a surfactant.

Experimental Examples 2-1 to 2-4

Secondary batteries were fabricated in the same procedures as those in Experimental Example 1-1, except for changing the content of the alkyl carbonate as shown in Table 2, and examined for various characteristics.

TABLE 2

| | | Electrolytic solution | | | | | | |
|---|---|---|---|---|---|---|---|---|
| | Alkyl | | Carbon number | | Content | Initial capacity | Capacity retention | Resistance |
| Experimental Example | carbonate | Structure | Main chain | Side chain | (% by weight) | (mAh) | rate (%) | change (mΩ) |
| 2-1 | Lithium octyl carbonate | Linear | 8 | — | 0.005 | 801 | 82 | 28 |
| 2-2 | | | | | 0.01 | 802 | 83 | 28 |
| 2-3 | | | | | 1 | 812 | 85 | 21 |
| 2-4 | | | | | 2 | 811 | 83 | 23 |

In the case of using an alkyl carbonate having a carbon number of the alkyl group falling within the appropriate range, not only high initial capacity and capacity retention rate were obtained, but the resistance change decreased without relying upon the content of the alkyl carbonate. In that case, when the content of the alkyl carbonate was from 0.005% by weight to 2% by weight, favorable results were obtained.

Experimental Examples 3-1 to 3-4

Secondary batteries were fabricated in the same procedures as those in Experimental Example 1-1, except for allowing an alkyl carbonate to be contained in the positive electrode 33 or the negative electrode 34 in place of the electrolytic solution as shown in Table 3, and examined for various characteristics. In the case of fabricating the positive electrode 33, after mixing the positive electrode active material, the positive electrode binder, and the positive electrode electrically conductive agent, the alkyl carbonate was added in a prescribed amount relative to the whole. In the case of fabricating the negative electrode 34, after mixing the negative electrode active material, the negative electrode binder, and the negative electrode electrically conductive agent, the alkyl carbonate was added in a prescribed amount relative to the whole.

TABLE 3

| Experimental Example | Alkyl carbonate | Structure | Carbon number | | Content (% by weight) | Place to contain | Initial capacity (mAh) | Capacity retention rate (%) | Resistance change (mΩ) |
|---|---|---|---|---|---|---|---|---|---|
| | | | Main chain | Side chain | | | | | |
| 3-1 | Lithium octyl carbonate | Linear | 8 | — | 0.5 | Positive electrode | 806 | 85 | 20 |
| 3-2 | | | | | 1 | | 809 | 85 | 20 |
| 3-3 | Lithium octyl carbonate | Linear | 8 | — | 0.5 | Negative electrode | 810 | 85 | 21 |
| 3-4 | | | | | 1 | | 812 | 84 | 22 |

Even when the alkyl carbonate was contained in the positive electrode 33 or the negative electrode 34, the same results as those in Table 1 were obtained. That is, when the positive electrode 33 or the negative electrode 34 contained an alkyl carbonate, not only the initial capacity and the capacity retention rate increased, but the resistance change significantly decreased. In that case, when the content of the alkyl carbonate was from 0.5% by weight to 1% by weight, favorable results were obtained.

From the results shown in Tables 1 to 3, it was confirmed that when at least one of the positive electrode 33, the negative electrode 34, and the electrolytic solution contains an alkyl carbonate, the battery characteristics are enhanced.

While the present application has been described with reference to the embodiments and working examples, it should not be construed that the present application is limited to the foregoing embodiments and working examples, and various modifications can be made therein. For example, the positive electrode active material of the present application is also similarly applicable to a lithium ion secondary battery in which the capacity of the negative electrode includes a capacity due to intercalation and deintercalation of a lithium ion and a capacity following the deposition and dissolution of a lithium metal and is expressed by a sum of these capacities. In that case, a chargeable capacity of the negative electrode material is set to be smaller than a discharge capacity of the positive electrode.

In addition, in the embodiments and working examples, while the present application has been described by reference to the case where the battery structure is of a cylindrical type or a laminated film type and the battery element has a wound structure, it should not be construed that the present application is limited thereto. The secondary battery of the present application is similarly applicable to the case where the secondary battery has other battery structure such as a coin type, a rectangular type, and a button type, or the case where the battery element has other structure such as a laminated structure.

The present application may be configured as the following configurations.

(1) A secondary battery including
an electrolytic solution, a positive electrode and a negative electrode,
at least one of the positive electrode, the negative electrode, and the electrolytic solution containing an alkyl carbonate represented by the following formula (1):

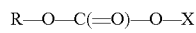

(1)

wherein R is a linear alkyl group or halogenated alkyl group having a carbon number of from 8 to 20, or a branched alkyl group or halogenated alkyl group having a carbon number of from 8 to 20 in a main chain thereof; and X is an alkali metal element.

(2) The secondary battery as set forth in the above item (1), wherein
a total carbon number of the branched alkyl group or halogenated alkyl group is not more than 20.

(3) The secondary battery as set forth in the above item (1) or (2), wherein
X in the formula (1) is Li.

(4) The secondary battery as set forth in any one of the above items (1) to (3), wherein
the alkyl carbonate is at least one member selected from the group consisting of lithium octyl carbonate, lithium nonyl carbonate, lithium decyl carbonate, lithium undecyl carbonate, lithium dodecyl carbonate, lithium tridecyl carbonate, lithium tetradecyl carbonate, lithium pentadecyl carbonate, lithium hexadecyl carbonate, lithium heptadecyl carbonate, lithium octadecyl carbonate, lithium nonadecyl carbonate, lithium eicosyl carbonate, lithium 2-butyloctyl carbonate, lithium 2-hexyldecyl carbonate, lithium 2-octyldodecyl carbonate, and halides thereof.

(5) The secondary battery as set forth in any one of the above items (1) to (4), wherein
the electrolytic solution contains the alkyl carbonate, and a content of the alkyl carbonate in the electrolytic solution is from 0.005% by weight to 2% by weight.

(6) The secondary battery as set forth in any one of the above items (1) to (4), wherein
the positive electrode contains a positive electrode active material layer, and the negative electrode contains a negative electrode active material layer, and
at least one of the positive electrode active material layer and the negative electrode active material layer contains the alkyl carbonate, and a content of the alkyl carbonate in the positive electrode active material layer or the negative electrode active material layer is from 0.5% by weight to 1% by weight.

(7) The secondary battery as set forth in any one of the above items (1) to (6), which is a lithium ion secondary battery.

(8) A battery pack including
the secondary battery as set forth in any one of the above items (1) to (7),
a control part for controlling the use state of the secondary battery, and
a switch part for switching the use state of the secondary battery depending upon an instruction of the control part,
the secondary battery including an electrolytic solution, a positive electrode and a negative electrode, and at least one of the positive electrode, the negative electrode, and the electrolytic solution containing an alkyl carbonate represented by the following formula (1):

$$R-O-C(=O)-O-X \qquad (1)$$

wherein R is a linear alkyl group or halogenated alkyl group having a carbon number of from 8 to 20, or a branched alkyl group or halogenated alkyl group having a carbon number of from 8 to 20 in a main chain thereof; and X is an alkali metal element.

(9) An electric vehicle including the secondary battery as set forth in any one of the above items (1) to (7), a conversion part for converting an electric power fed from the secondary battery into a driving force, a drive part for driving depending upon the driving force, and a control part for controlling the use state of the secondary battery, the secondary battery including an electrolytic solution, a positive electrode and a negative electrode, and at least one of the positive electrode, the negative electrode, and the electrolytic solution containing an alkyl carbonate represented by the following formula (1):

$$R-O-C(=O)-O-X \qquad (1)$$

wherein R is a linear alkyl group or halogenated alkyl group having a carbon number of from 8 to 20, or a branched alkyl group or halogenated alkyl group having a carbon number of from 8 to 20 in a main chain thereof; and X is an alkali metal element.

(10) An electric power storage system including the secondary battery as set forth in any one of the above items (1) to (7), one or two or more electric appliances, a control part for controlling an electric power feed into the electric appliance or appliances from the secondary battery, the secondary battery including an electrolytic solution, a positive electrode and a negative electrode, and at least one of the positive electrode, the negative electrode, and the electrolytic solution containing an alkyl carbonate represented by the following formula (1):

$$R-O-C(=O)-O-X \qquad (1)$$

wherein R is a linear alkyl group or halogenated alkyl group having a carbon number of from 8 to 20, or a branched alkyl group or halogenated alkyl group having a carbon number of from 8 to 20 in a main chain thereof; and X is an alkali metal element.

(11) A power tool including the secondary battery as set forth in any one of the above items (1) to (7), and a movable part into which an electric power is fed from the secondary battery, the secondary battery including an electrolytic solution, a positive electrode and a negative electrode, and at least one of the positive electrode, the negative electrode, and the electrolytic solution containing an alkyl carbonate represented by the following formula (1):

$$R-O-C(=O)-O-X \qquad (1)$$

wherein R is a linear alkyl group or halogenated alkyl group having a carbon number of from 8 to 20, or a branched alkyl group or halogenated alkyl group having a carbon number of from 8 to 20 in a main chain thereof; and X is an alkali metal element.

(12) An electronic appliance including the secondary battery as set forth in any one of the above items (1) to (7) as an electric power feed source, the secondary battery including an electrolytic solution, a positive electrode and a negative electrode, and at least one of the positive electrode, the negative electrode, and the electrolytic solution containing an alkyl carbonate represented by the following formula (1):

$$R-O-C(=O)-O-X \qquad (1)$$

wherein R is a linear alkyl group or halogenated alkyl group having a carbon number of from 8 to 20, or a branched alkyl group or halogenated alkyl group having a carbon number of from 8 to 20 in a main chain thereof; and X is an alkali metal element.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A secondary battery comprising:
an electrolytic solution;
a positive electrode; and
a negative electrode,
at least one of the positive electrode, the negative electrode, and the electrolytic solution containing an alkyl carbonate represented by the following formula (1)

$$R-O-C(=O)-O-X \qquad (1)$$

wherein R is a linear alkyl group or halogenated alkyl group having a carbon number of from 8 to 20, or a branched alkyl group or halogenated alkyl group having a carbon number of from 8 to 20 in a main chain thereof; and X is Li.

2. The secondary battery according to claim 1, wherein a total carbon number of the branched alkyl group or halogenated alkyl group is not more than 20.

3. The secondary battery according to claim 1, wherein the alkyl carbonate is at least one member selected from the group consisting of lithium octyl carbonate, lithium nonyl carbonate, lithium decyl carbonate, lithium undecyl carbonate, lithium dodecyl carbonate, lithium tridecyl carbonate, lithium tetradecyl carbonate, lithium pentadecyl carbonate, lithium hexadecyl carbonate, lithium heptadecyl carbonate, lithium octadecyl carbonate, lithium nonadecyl carbonate, lithium eicosyl carbonate, lithium 2-butyloctyl carbonate, lithium 2-hexyldecyl carbonate, lithium 2-octyldodecyl carbonate, and halides thereof.

4. The secondary battery according to claim 1, wherein the electrolytic solution contains the alkyl carbonate, and a content of the alkyl carbonate in the electrolytic solution is from 0.005% by weight to 2% by weight.

5. The secondary battery according to claim 1, wherein the positive electrode contains a positive electrode active material layer, and the negative electrode contains a negative electrode active material layer, and at least one of the positive electrode active material layer and the negative electrode active material layer contains the alkyl carbonate, and a content of the alkyl carbonate in the positive electrode active material layer or the negative electrode active material layer is from 0.5% by weight to 1% by weight.

6. A battery pack comprising:
a secondary battery;
a control part for controlling the use state of the secondary battery; and
a switch part for switching the use state of the secondary battery depending upon an instruction of the control part,
the secondary battery including an electrolytic solution, a positive electrode and a negative electrode, and
at least one of the positive electrode, the negative electrode, and the electrolytic solution containing an alkyl carbonate represented by the following formula (1)

$$R\text{—}O\text{—}C(\text{=}O)\text{—}O\text{—}X \tag{1}$$

wherein R is a linear alkyl group or halogenated alkyl group having a carbon number of from 8 to 20, or a branched alkyl group or halogenated alkyl group having a carbon number of from 8 to 20 in a main chain thereof; and X is Li.

7. An electric vehicle comprising:
a secondary battery;
a conversion part for converting an electric power fed from the secondary battery into a driving force;
a drive part for driving depending upon the driving force; and
a control part for controlling the use state of the secondary battery,
the secondary battery including an electrolytic solution, a positive electrode and a negative electrode, and
at least one of the positive electrode, the negative electrode, and the electrolytic solution containing an alkyl carbonate represented by the following formula (1)

$$R\text{—}O\text{—}C(\text{=}O)\text{—}O\text{—}X \tag{1}$$

wherein R is a linear alkyl group or halogenated alkyl group having a carbon number of from 8 to 20, or a branched alkyl group or halogenated alkyl group having a carbon number of from 8 to 20 in a main chain thereof; and X is Li.

8. An electric power storage system comprising:
a secondary battery;
one or two or more electric appliances; and
a control part for controlling an electric power feed into the electric appliance or appliances from the secondary battery,
the secondary battery including an electrolytic solution, a positive electrode and a negative electrode, and
at least one of the positive electrode, the negative electrode, and the electrolytic solution containing an alkyl carbonate represented by the following formula (1)

$$R\text{—}O\text{—}C(\text{=}O)\text{—}O\text{—}X \tag{1}$$

wherein R is a linear alkyl group or halogenated alkyl group having a carbon number of from 8 to 20, or a branched alkyl group or halogenated alkyl group having a carbon number of from 8 to 20 in a main chain thereof; and X is Li.

9. A power tool comprising:
a secondary battery; and
a movable part into which an electric power is fed from the secondary battery,
the secondary battery including an electrolytic solution, a positive electrode and a negative electrode, and
at least one of the positive electrode, the negative electrode, and the electrolytic solution containing an alkyl carbonate represented by the following formula (1)

$$R\text{—}O\text{—}C(\text{=}O)\text{—}O\text{—}X \tag{1}$$

wherein R is a linear alkyl group or halogenated alkyl group having a carbon number of from 8 to 20, or a branched alkyl group or halogenated alkyl group having a carbon number of from 8 to 20 in a main chain thereof; and X is Li.

10. An electronic appliance comprising:
a secondary battery as an electric power feed source,
the secondary battery including an electrolytic solution, a positive electrode and a negative electrode, and
at least one of the positive electrode, the negative electrode, and the electrolytic solution containing an alkyl carbonate represented by the following formula (1)

$$R\text{—}O\text{—}C(\text{=}O)\text{—}O\text{—}X \tag{1}$$

wherein R is a linear alkyl group or halogenated alkyl group having a carbon number of from 8 to 20, or a branched alkyl group or halogenated alkyl group having a carbon number of from 8 to 20 in a main chain thereof; and X is Li.

11. The battery pack according to claim 6, wherein
a total carbon number of the branched alkyl group or halogenated alkyl group is not more than 20.

12. The battery pack according to claim 6, wherein
the alkyl carbonate is at least one member selected from the group consisting of lithium octyl carbonate, lithium nonyl carbonate, lithium decyl carbonate, lithium undecyl carbonate, lithium dodecyl carbonate, lithium tridecyl carbonate, lithium tetradecyl carbonate, lithium pentadecyl carbonate, lithium hexadecyl carbonate, lithium heptadecyl carbonate, lithium octadecyl carbonate, lithium nonadecyl carbonate, lithium eicosyl carbonate, lithium 2-butyloctyl carbonate, lithium 2-hexyldecyl carbonate, lithium 2-octyldodecyl carbonate, and halides thereof.

13. The battery pack according to claim 6, wherein
the electrolytic solution contains the alkyl carbonate, and a content of the alkyl carbonate in the electrolytic solution is from 0.005% by weight to 2% by weight.

14. The battery pack according to claim 6, wherein
the positive electrode contains a positive electrode active material layer, and the negative electrode contains a negative electrode active material layer, and
at least one of the positive electrode active material layer and the negative electrode active material layer contains the alkyl carbonate, and a content of the alkyl carbonate in the positive electrode active material layer or the negative electrode active material layer is from 0.5% by weight to 1% by weight.

15. The electric power storage system according to claim 8, wherein
a total carbon number of the branched alkyl group or halogenated alkyl group is not more than 20.

16. The electric power storage system according to claim 8, wherein
the alkyl carbonate is at least one member selected from the group consisting of lithium octyl carbonate, lithium nonyl carbonate, lithium decyl carbonate, lithium undecyl carbonate, lithium dodecyl carbonate, lithium tridecyl carbonate, lithium tetradecyl carbonate, lithium pentadecyl carbonate, lithium hexadecyl carbonate, lithium heptadecyl carbonate, lithium octadecyl carbonate, lithium nonadecyl carbonate, lithium eicosyl carbonate, lithium 2-butyloctyl carbonate, lithium 2-hexyldecyl carbonate, lithium 2-octyldodecyl carbonate, and halides thereof.

17. The electric power storage system according to claim 8, wherein
the electrolytic solution contains the alkyl carbonate, and a content of the alkyl carbonate in the electrolytic solution is from 0.005% by weight to 2% by weight.

18. The electric power storage system according to claim 8, wherein
- the positive electrode contains a positive electrode active material layer, and the negative electrode contains a negative electrode active material layer, and
- at least one of the positive electrode active material layer and the negative electrode active material layer contains the alkyl carbonate, and a content of the alkyl carbonate in the positive electrode active material layer or the negative electrode active material layer is from 0.5% by weight to 1% by weight.

19. The electric vehicle according to claim 7, wherein
- a total carbon number of the branched alkyl group or halogenated alkyl group is not more than 20.

20. The electric vehicle according to claim 7, wherein
- the alkyl carbonate is at least one member selected from the group consisting of lithium octyl carbonate, lithium nonyl carbonate, lithium decyl carbonate, lithium undecyl carbonate, lithium dodecyl carbonate, lithium tridecyl carbonate, lithium tetradecyl carbonate, lithium pentadecyl carbonate, lithium hexadecyl carbonate, lithium heptadecyl carbonate, lithium octadecyl carbonate, lithium nonadecyl carbonate, lithium eicosyl carbonate, lithium 2-butyloctyl carbonate, lithium 2-hexyldecyl carbonate, lithium 2-octyldodecyl carbonate, and halides thereof.

* * * * *